(12) United States Patent
Huebner

(10) Patent No.: US 8,388,151 B2
(45) Date of Patent: Mar. 5, 2013

(54) OBJECT AWARE, TRANSFORMABLE PROJECTION SYSTEM

(76) Inventor: Kenneth J. Huebner, Milwaukee, WI (US)

( * ) Notice: Subject to any disclaimer, the term of this patent is extended or adjusted under 35 U.S.C. 154(b) by 256 days.

(21) Appl. No.: 12/508,022

(22) Filed: Jul. 23, 2009

(65) Prior Publication Data

US 2011/0019162 A1   Jan. 27, 2011

(51) Int. Cl.
*G03B 21/14* (2006.01)
(52) U.S. Cl. ............. 353/119; 353/31; 353/39; 353/46; 353/69; 353/70; 353/101
(58) Field of Classification Search ............. 353/28, 353/30, 31, 39, 46, 69, 70, 101, 119; 348/745–747, 348/806, 333.01, 744, E05.022, E09.025; 340/572.1, 572.4, 539.23, 539.25; 250/221, 250/559.4
See application file for complete search history.

(56) References Cited

U.S. PATENT DOCUMENTS

| | | | |
|---|---|---|---|
| 5,504,501 A * | 4/1996 | Hauck et al. .................. 345/158 |
| 5,526,146 A * | 6/1996 | Goodman et al. ................ 349/5 |
| 6,371,616 B1 * | 4/2002 | Doany et al. .................... 353/39 |
| 6,554,431 B1 | 4/2003 | Binsted et al. |
| 6,806,850 B2 * | 10/2004 | Chen ................................ 345/7 |
| 7,134,078 B2 * | 11/2006 | Vaarala ......................... 715/730 |
| 7,137,707 B2 * | 11/2006 | Beardsley et al. .............. 353/69 |
| 7,154,395 B2 | 12/2006 | Raskar et al. |
| 7,154,397 B2 | 12/2006 | Zerhusen et al. |
| 7,284,866 B2 * | 10/2007 | Buchmann ...................... 353/42 |
| 7,290,885 B2 * | 11/2007 | Salvatori et al. ................ 353/36 |
| 7,445,550 B2 | 11/2008 | Barney et al. |
| 7,857,460 B2 * | 12/2010 | Klosowiak et al. ............. 353/69 |
| 7,862,179 B2 * | 1/2011 | Shan et al. ....................... 353/42 |
| 7,891,826 B2 * | 2/2011 | Fujinawa et al. ............. 353/119 |
| 2003/0117343 A1 * | 6/2003 | Kling ............................... 345/32 |
| 2004/0017518 A1 * | 1/2004 | Stern et al. ..................... 348/744 |
| 2005/0237297 A1 * | 10/2005 | Holloway et al. ............. 345/157 |
| 2007/0040800 A1 * | 2/2007 | Forlines et al. ............... 345/158 |
| 2007/0249396 A1 * | 10/2007 | Nitta et al. ................... 455/556.1 |
| 2007/0282564 A1 | 12/2007 | Sprague et al. |
| 2008/0061985 A1 | 3/2008 | Strzelczyk |
| 2008/0136973 A1 * | 6/2008 | Park .............................. 348/744 |
| 2008/0273755 A1 | 11/2008 | Hildreth |
| 2009/0015799 A1 | 1/2009 | Luciano |
| 2009/0051653 A1 | 2/2009 | Barney et al. |
| 2009/0076642 A1 | 3/2009 | Ferren et al. |
| 2009/0097755 A1 | 4/2009 | Shingu et al. |
| 2009/0108532 A1 | 4/2009 | Darling |
| 2009/0109030 A1 | 4/2009 | Do et al. |
| 2009/0128499 A1 | 5/2009 | Izadi et al. |
| 2009/0128785 A1 | 5/2009 | Silverstein |
| 2009/0251585 A1 * | 10/2009 | Joseph ..................... 348/333.01 |

* cited by examiner

*Primary Examiner* — Georgia Y Epps
*Assistant Examiner* — Sultan Chowdhury
(74) *Attorney, Agent, or Firm* — Andrus, Sceales, Starke & Sawall, LLP

(57) ABSTRACT

An interactive image projecting device that projects an image onto a display surface and controls the projected image based upon the detection or identification of the device housing or the remote object. The device has a touch-sensitive, flexible housing that may be transformed into different shapes. The image projecting device includes a projector that generates an image from a control unit. The device includes an illuminating emitter, which illuminates the device body and remote objects, and a light sensor that is operable to detect the position of its housing or remote object. Based upon the sensed housing or remote object, the control unit operates to modify the image projected from the device such that the image from the device can interact with its housing or remote object.

32 Claims, 27 Drawing Sheets

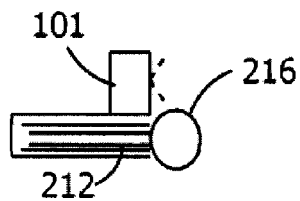 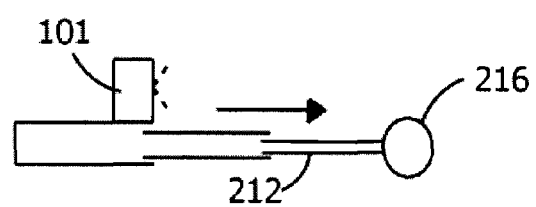
FIG. 7A    FIG. 7B
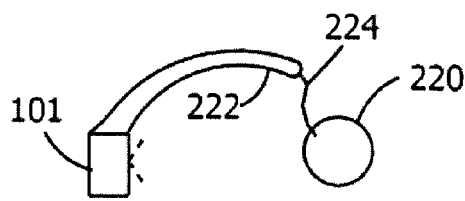 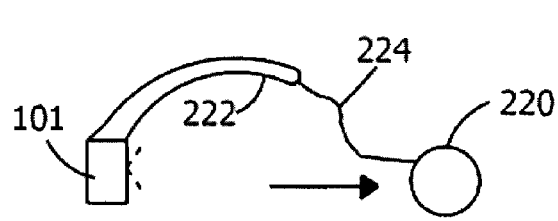
FIG. 8A    FIG. 8B
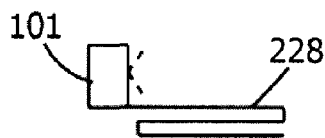 
FIG. 9A    FIG. 9B
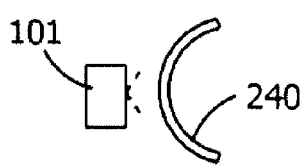 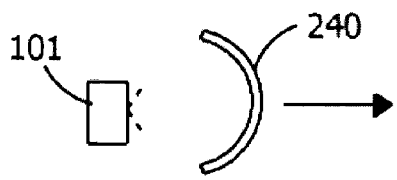
FIG. 10A    FIG. 10B

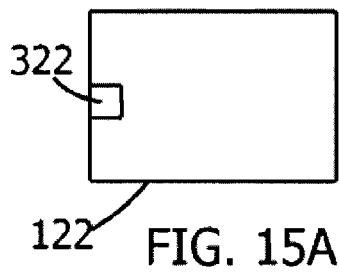
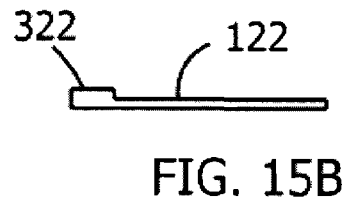
FIG. 15A    FIG. 15B
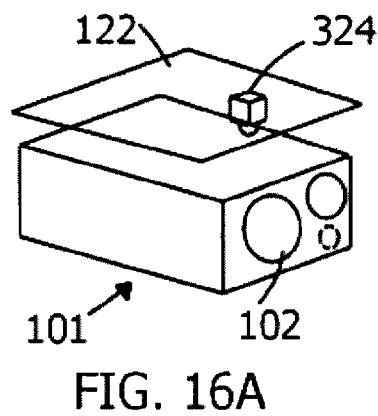
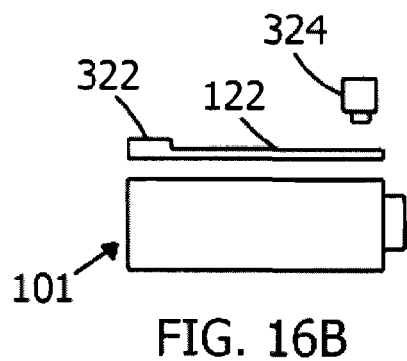
FIG. 16A    FIG. 16B
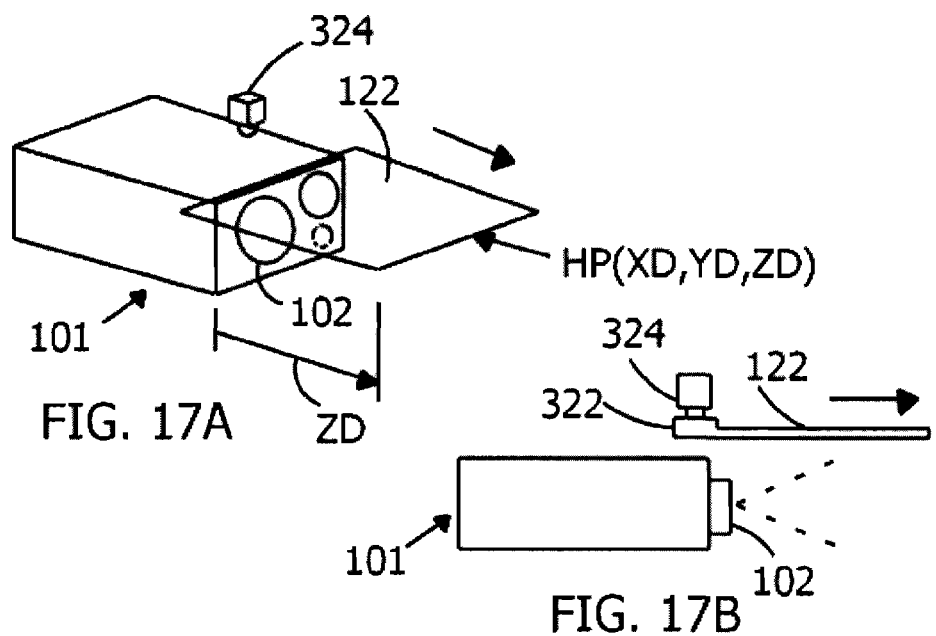
FIG. 17A    FIG. 17B
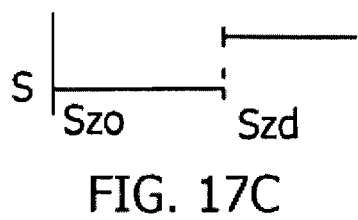
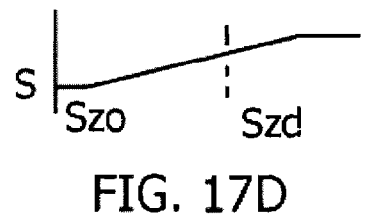
FIG. 17C    FIG. 17D

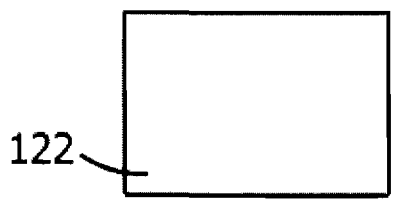
FIG. 18A     FIG. 18B
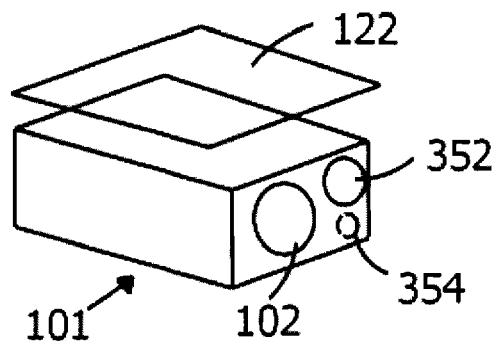
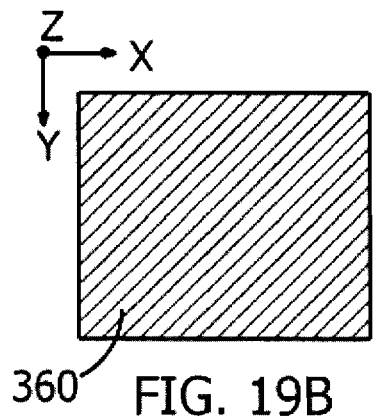
FIG. 19A     FIG. 19B
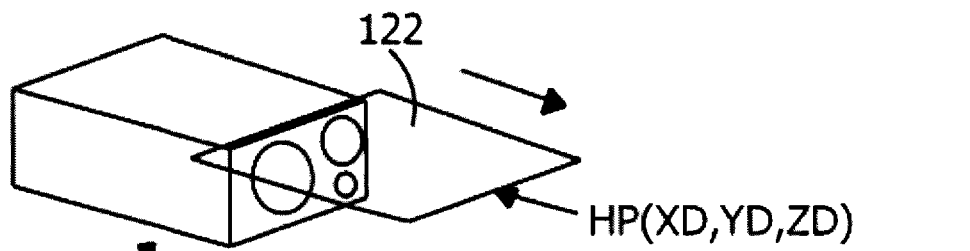
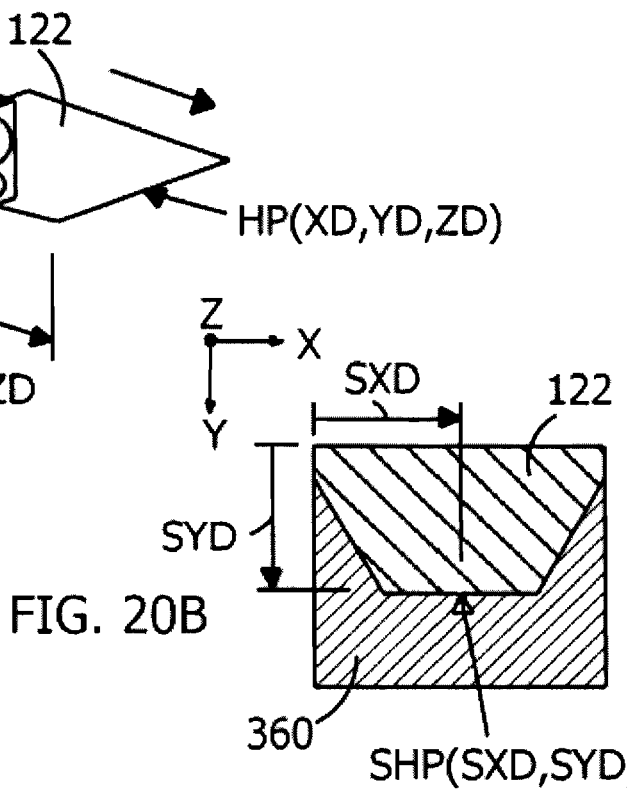
FIG. 20A     FIG. 20B

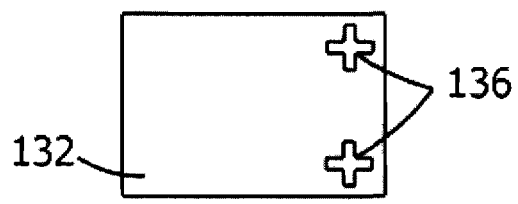
FIG. 21A    FIG. 21B
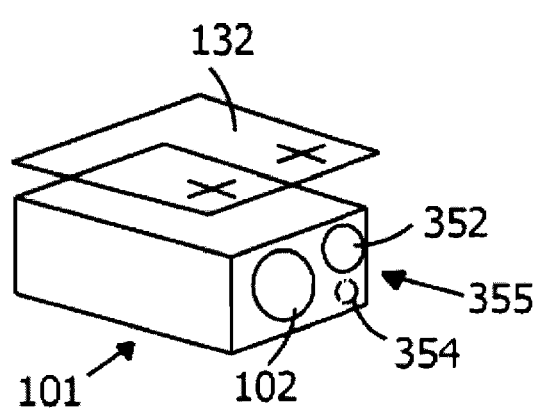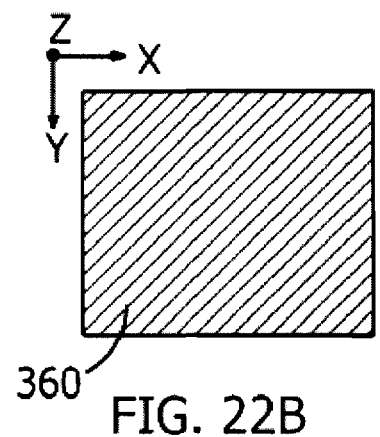
FIG. 22A    FIG. 22B
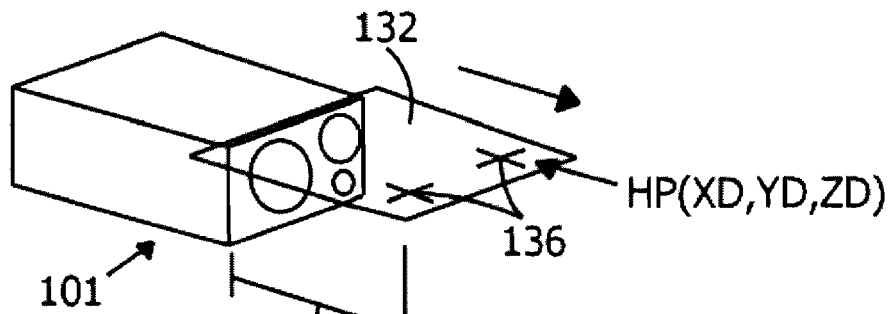
FIG. 23A
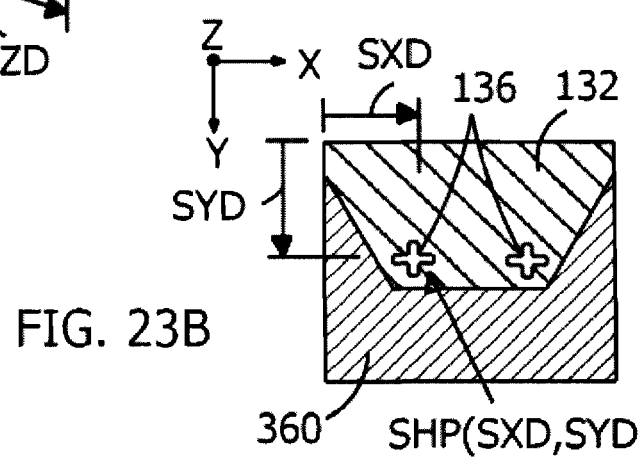
FIG. 23B

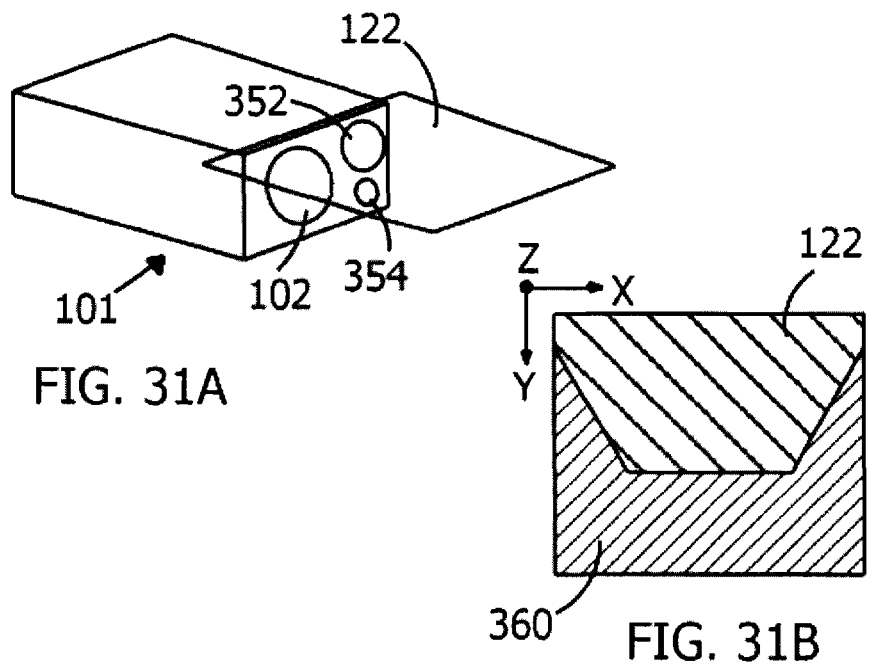
FIG. 31A
FIG. 31B
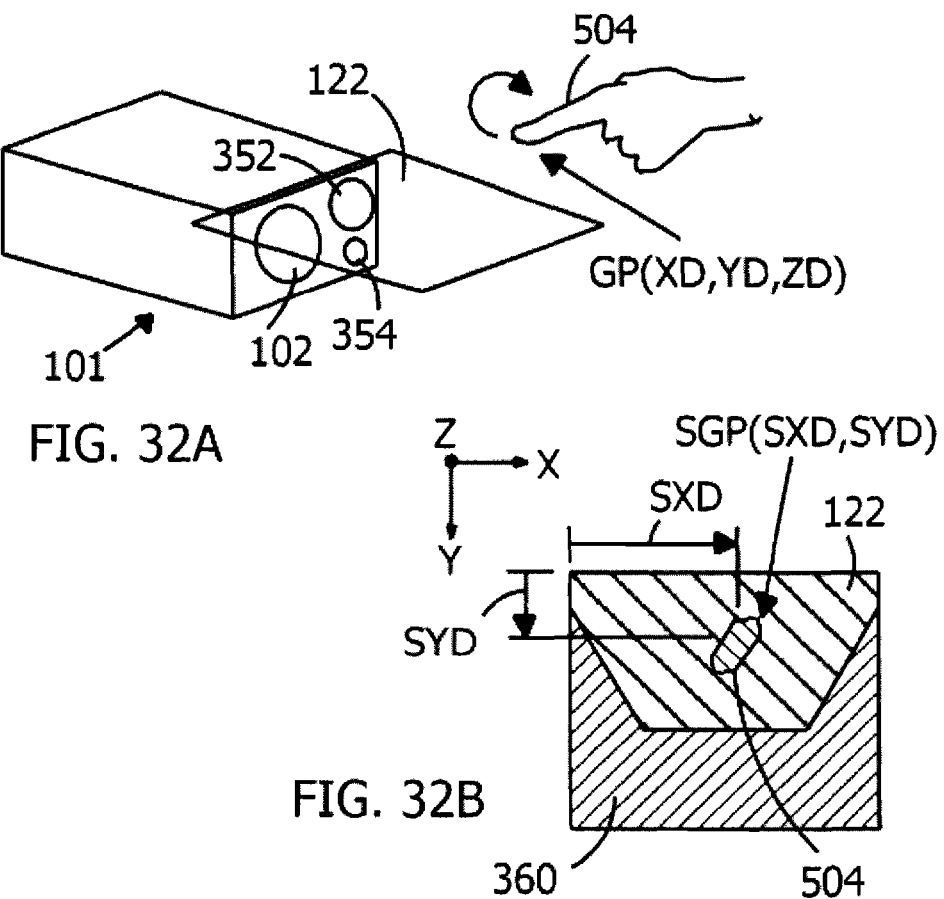
FIG. 32A
FIG. 32B

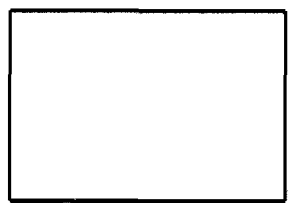
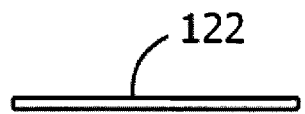
FIG. 57A   FIG. 57B
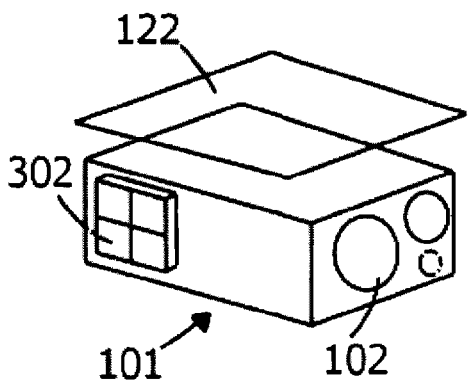
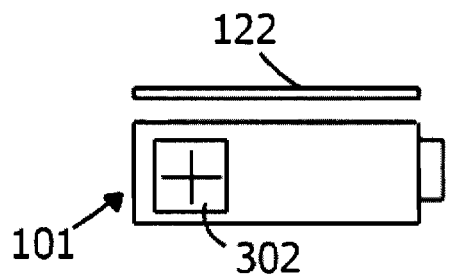
FIG. 58A   FIG. 58B
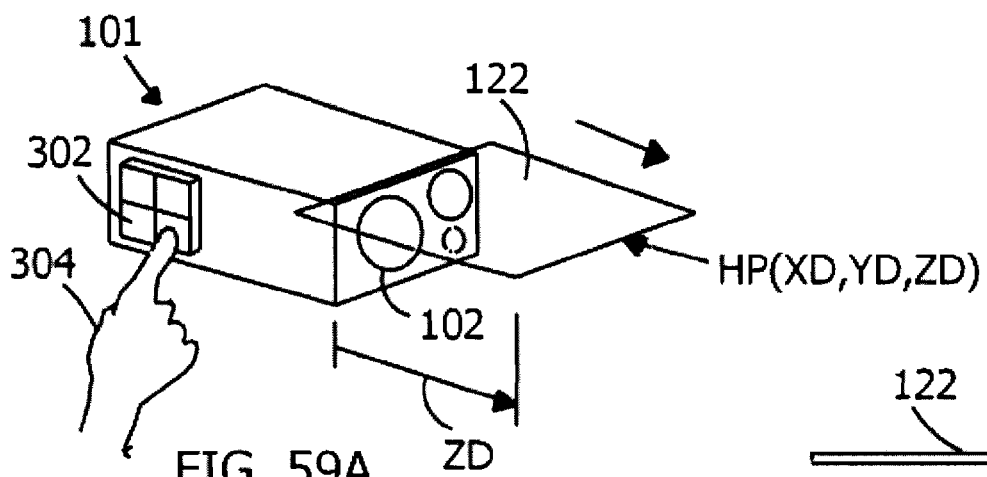
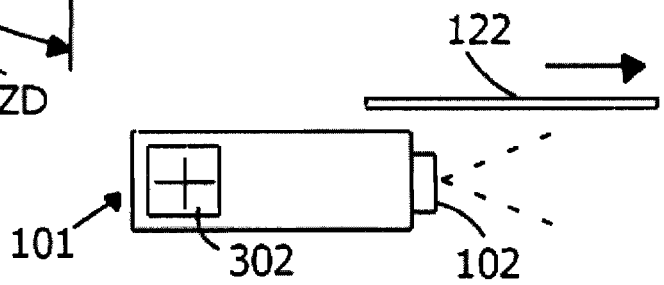
FIG. 59A   FIG. 59B

OBJECT AWARE, TRANSFORMABLE PROJECTION SYSTEM

FIELD OF THE INVENTION

The present invention generally relates to image projecting devices. More specifically, the present invention relates to image projecting devices that control the image being projected based upon the proximity and identity of its housing and remote objects in the surrounding environment.

BACKGROUND OF THE INVENTION

Currently, there are limited applications for image projection devices. An age-old practice is to project a video image on a remote screen for business, education, and entertainment purposes. Though the projected video image can be stunningly beautiful, an audience can never reach out and touch the screen or the projection device and interact. Likewise, objects in the surrounding environment cannot effectively engage the projector in a meaningful interaction. As a result, the typical light projector is an unassuming device with one capability: displaying an image on a distant wall.

Moreover, manufacturers are introducing compact image projectors that can be embedded into other devices, such as video cameras or cell phones. The current focus of these projection systems is also to provide a means to project images, rather than utilize the projector for interactive participation with the user.

Therefore, an opportunity exists for interactive projectors being used for a variety of applications, such as trade show display, building construction, military surveillance, medical treatment, and entertainment. In such applications, users require devices that respond to ever-changing needs. Whereby, an image projector in combination with an object aware, transformable body enables a projection system to change its physical shape, appearance, and interactive behavior relative to the demands of the user and environment.

SUMMARY OF THE INVENTION

The present invention generally relates to an image projecting device in which the device generates an output image. Moreover, the image projecting device can control the image being projected based upon the proximity and identity of its transformable housing and remote objects in the surrounding environment. A synergy results, as the projection device can transform its physical shape and surface coloration, along with its interactive behavior, so as to simulate transforming into a wholly different kind of device.

The image projecting device includes a microprocessor-based control unit that is operatively associated with a laser- or LED-based projector for projecting a visible image from the device.

Along with the projector, the image projecting device may include an image sensor that is operable to detect and identify objects in the vicinity of the image projecting device. As an example, the image sensor may be a CMOS camera that is able to detect housing objects (integral to the device) and distant remote objects (apart from the device). The image sensor is coupled to the control unit such that the control unit can respond to images sensed by the image sensor.

To enhance the image sensor's view, the image projecting device may include an illuminating emitter. Preferably, the illuminating emitter is an infrared LED that provides invisible illumination for detecting objects without impairing the projected visible image.

Along with the illuminating emitter, the image projecting device may include a tag reader, such as a barcode reader. The tag reader can identify objects that have an encoded tag, such as a barcode—or an electronically active tag, such as an RFID tag. The tag reader is operably connected to the control unit, such that, based upon the tag reader's signal, the control unit can modify the device's projected image to simulate interacting with the identified object.

The projecting device may also contain other sensory input and output components. For example, the image projecting device may contain a spatial sensor, such as an accelerometer. The spatial sensor can be mounted within the housing of the image projecting device and operably generate a position signal that is received by the control unit. Based on the position signal, the control unit modifies the projected image according to the device's position relative to a detected remote object.

The image projecting device may include a wireless data transceiver for communication with other devices and remote objects. The communication with the remote objects enables the device to interact with the object such that the image displayed by the device can be modified according to the object's identity and behavior.

In one embodiment, the image projecting device may have a shape-changing, outer housing. The housing may be squeezed or stretched by the user, altering its 3-D shape. In one embodiment, the projector is placed inside a translucent, ball shaped housing. The device then illuminates its interior with a world map, giving the appearance of a world globe. When the user squeezes flat the globe, the globe turns into a ticking, gold pocket watch—having a wholly different interactive behavior.

The transformable, color-changing device may also be touch sensitive. Such an image projecting device typically includes the image sensor, illuminating emitter, and projector positioned near its translucent body. When the illuminating emitter is activated, the image sensor views the translucent body and any object beyond it. When a user's fingertip touches the translucent body, a bright spot appears in the image sensor's view. Based upon the presence or absence of the bright spot, the device's control unit can complete desired actions. In one aspect, when a user touches Africa on the illuminated world globe, a lion appears, accompanied with roaring sound effects. In another aspect, when the user touches the illuminated, gold pocket watch, musical bells chime with the current hour.

BRIEF DESCRIPTION OF THE DRAWINGS

The drawings illustrate the best mode presently contemplated of carrying out the invention. In the drawings:

FIG. 7A is a section view of a contracted, telescoping housing;

FIG. 7B is a section view of a extended, telescoping housing;

FIG. 8A is a section view of a near, tethered housing;

FIG. 8B is a section view of a distant, tethered housing;

FIG. 9A is a section view of a stored, foldable housing;

FIG. 9B is a section view of a expanded, foldable housing;

FIG. 10A is a section view of a convex, inverting housing;

FIG. 10B is a section view of a concave, inverting housing;

FIG. 15A is a top view of an untagged housing with a position reference;

FIG. 15B is a side view of an untagged housing with a position reference;

FIG. 16A is a perspective view of projection subsystem and a pushed in, untagged housing;

FIG. 16B is a side view of the projection subsystem and a pushed in, untagged housing;

FIG. 17A is a perspective view of projection subsystem and an extended, untagged housing;

FIG. 17B is a side view of projection subsystem and an extended, untagged housing;

FIG. 17C is a signal from a position sensor that is a contact switch.

FIG. 17D is a signal from a position sensor that is a proximity sensor.

FIG. 18A is a top view of an untagged housing;

FIG. 18B is a side view of an untagged housing;

FIG. 19A is a perspective view of projection subsystem and a pushed in, untagged housing;

FIG. 19B is an image sensor view of a pushed in, untagged housing;

FIG. 20A is a perspective view of projection subsystem and an extended, untagged housing;

FIG. 20B is an image sensor view of an extended, untagged housing;

FIG. 21A is a top view of a tagged housing;

FIG. 21B is a side view of a tagged housing;

FIG. 22A is a perspective view of projection subsystem and a pushed in, tagged housing;

FIG. 22B is an image sensor view of a pushed in, tagged housing;

FIG. 23A is a perspective view of projection subsystem and an extended, tagged housing;

FIG. 23B is an image sensor view of an extended, tagged housing;

FIG. 31A is a perspective view of projection subsystem and an untagged housing, with no finger gesture;

FIG. 31B is an image sensor view of an untagged housing, with no finger gesture;

FIG. 32A is a perspective view of projection subsystem and an untagged housing, with a finger gesture above the housing;

FIG. 32B is an image sensor view of an untagged housing, with a finger gesture;

FIG. 57A is a top view of an untagged housing;

FIG. 57B is a side view of an untagged housing;

FIG. 58A is a perspective view of the projection subsystem, input device, and untagged housing;

FIG. 58B is a side view of the projection subsystem, input device, and untagged housing;

FIG. 59A is a perspective view of projection subsystem, input device, and extended housing, where a finger is touching the input device; and FIG. 59B is a side view of projection subsystem, input device, and extended housing, where a projector is activated.

DETAILED DESCRIPTION OF THE INVENTION

An Object Aware, Transformable Projection System

Figure 1:
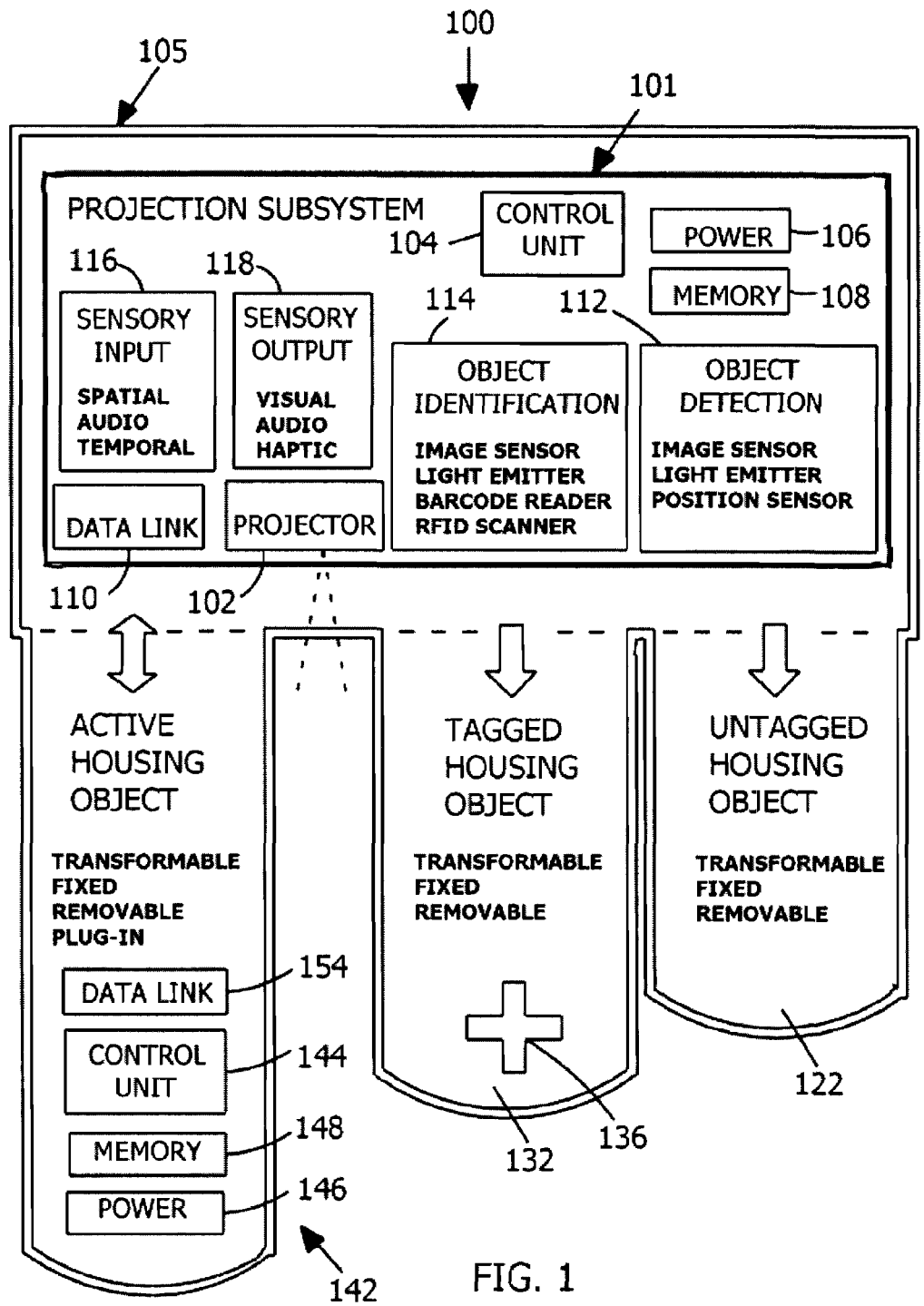
FIG. 1 is a block diagram of the transformable projection system, along with three kinds of housing objects.

Referring first to FIG. 1, thereshown is a block diagram of the major components of a transfonnable projection system 100, which is a general embodiment defined in accordance with the present disclosure. System 100 may be mobile, such as a hand held device—or immobile, where the device may be fixed to a building interior or exterior. Further, system 100 contains a projection subsystem 101 that projects visible light and facilitates object awareness of its surrounding housing and environment.

Projection Subsystem

The projection subsystem 101 is shown in FIG. 1 comprising an assembly of components, such as projector 102. Projector 102 creates a visible image that can illuminate the surfaces of objects, both near and far. The projector 102 can be a Light Emitting Diode (LED)-, Liquid Crystal on Silicon (LCOS)-, Digital Light Processor (DLP)-, or Laser-based projector, although other types of projectors are clearly contemplated as being within the scope of the present invention. Preferably, a laser-based projector is desirable as it has infinite focus without optical correction.

Detecting objects is one feature of the present disclosure. Whereby, an object detection module 112 enables subsystem 101 to detect local and remote objects. The object detection module 112 may contain an image sensor, photo detector, capacitance sensor, inductance sensor, electric field sensor, magnetic flux sensor, or ultrasonic sensor, although other types of sensors are clearly contemplated for detecting objects. Examples of an image sensor are a CMOS camera, CCD camera, 3-D depth camera, photodetect sensor, photodiode array, cadmium sulfide cell, or thermal image sensor. An example of an electric field sensor is a Freescale MC33941 Electric Field Imaging Device, which works much like a proximity detector. Magnetic sensors may be Hall effect sensors or reed switches. Though there are many ways to detect an object, the use of an infrared image sensor in combination with an infrared light emitter is preferred. Preferably, the image sensor is a CMOS camera with an infrared bandpass filter forward of the CMOS sensor, allowing infrared light to pass into the sensor while blocking non-infrared light. The preferred emitter is an infrared light emitter, such as an infrared LED of 880-950 nm wavelength. Moreover, a plurality of light emitters may be positioned in strategic locations for better illumination and object detection capability.

Identifying objects further enhances the object awareness of subsystem 101. Whereby, an object identification module 114 enables the subsystem 101 to identify near and distant objects. The object identification module 114 can be an image sensor, magnetic sensor, ultrasonic sensor, tag/barcode reader, or Radio Frequency Identification (RFID) scanner. The image sensor can be a photodetect, CMOS, or CCD sensor able to visually perceive a marker, encoded tag, or barcode. The magnetic sensor, such as a hall effect transistor or reed switch, may identify a distinct pattern in the surrounding magnetic field. An ultrasonic receiver can be used to recognize a modulated or encoded sound. Finally, the tag or barcode reader typically involves a laser-, LED- or camera-based reader. In each case, the sensor has a field of view in which it can detect the presence of an object or person, as will be set forth below.

Subsystem 101 may be further outfitted with a sensory input module 116 containing an accelerometer, gyroscope, range locator, GPS receiver, audio microphone, clock, digital compass, RADAR, etc. In addition, subsystem 101 may also contain a sensory output module 118 having a LCD graphic display, a sound synthesizer for audio playback, and a mechanical vibrator for haptic response, etc. Other kinds of sensory components are clearly contemplated to be within the scope of the present invention.

The projection subsystem 101 further includes a data transceiver 10, providing a wireless data link with objects and other devices. The transceiver 110 may use modulated RF, infrared or visible light, or ultrasonic sound to provide wireless communication. In addition, there may be a plug-in data port so that a wired hookup is possible with active housing or remote objects—including other subsystems 101.

Subsystem 101 also includes data memory 108 for retaining information. The data memory 108 may be RAM and Flash memory, although other types of storage capacity should be considered, fixed or removable.

At the heart of subsystem 101 is a control unit 104. The control unit 104 is a microcontroller or microprocessor, having appreciable speed to control many of the electronic components in real-time. Control unit 104 is operatively coupled to the projector 102, data memory 108, data transceiver 110, object detection module 112, object identification module 114, sensory input module 116, and sensory output module 118.

Finally, a power source 106 provides all of the electrical energy needs of subsystem 101. The power source 106 may be an internal battery, rechargeable pack—or a power cord connected to an external power supply.

Transformable Housing

FIG. 1 shows a transformable housing 105 that surrounds and protects subsystem 101. Keep in mind that subsystem 101 may be permanently attached to housing 105, or subsystem 101 may be removable from the housing 105. Whereby, the transformable housing 105 may act as a low cost, portable case for subsystem 101.

Further, with its shape changing capabilities, the transformable housing 105 may be altered into myriad physical forms. The transforming capability is possible since the whole housing 105, which may he referred to as a housing object, or a plurality of housing elements or housing objects such as housing objects 122, 132, and 142, may be expanded, collapsed, hidden away, or rolled-up. Some housing objects may be removable and replaced with different shaped housing objects. Other housing objects may be permanently fixed.

The transformable housing 105 is typically made of soft, flexible materials such as foam rubber, polyethylene, high-density urethane, silicone gel, or cloth, although other materials are considered as being within the scope of the present invention. Sometimes housing materials are transparent or translucent, allowing both visible and invisible light to be transmitted through the housing 105. In addition, some housing materials may be rigid plastic or metal to provide structural support, such as for a writing tablet.

The transformable housing 105 may be manually or automatically transformed. During manual transformation, the user typically reaches out and squeezes or pulls on the transformable housing 105, causing a change in shape. Though a manual approach works, an automatic means to change the housing shape has been clearly contemplated. For example, an electro-mechanical linkage may be provided within system 100, such as a motorized oscillator or solenoid linked to the moveable housing 105 and activated by control unit 104. The housing 105 may also be made of electroactive polymer (EAP) such that the control unit 104 can electronically modulate the electroactive polymer, providing shape changing capabilities with perhaps touch sensitive, haptic feedback. Examples of described electroactive polymers include U.S. Pat. Application Nos. 2008/0284277, 2009/0130423, and 2007/0146317.

Definition of Housing Objects

FIG. 1 illustrates three types of housing objects that are detectable by subsystem 101. The housing objects are an untagged housing object 122, tagged housing object 132, and active housing object 142.

Keep in mind that a single housing object may be a component of the transformable housing 105—or encompass the entire transformable housing 105. An example of a full-body housing object is an embodiment made of a single, blow-molded, hollow plastic housing (having no appendages) with projection subsystem 101 in its interior, such that the housing can be squeezed in and out like an accordion.

As mentioned earlier, typical housing objects 122, 132, 142 are soft and transformable—capable of rolling up, flexing, or collapsing for storage within the transformable housing 105. Examples of a shape changing housing object include: 1) a roll-up polymer strip with auto-retract; 2) a spring shape that stretches; 3) a telescoping tube that slides into a pocket; 4) a fold-up origami like plastic film; or 4) an inflatable balloon like membrane.

In some embodiments, housing objects 122, 132, 142 may be removed from the transformable housing 105 and replaced with different shaped housing objects. Subsystem 101 is further able to detect a change in the transforming housing 105. For example, housing object 122 can be removed and a different shaped housing object is reattached to housing 105. Projection subsystem 101 detects the notable change in the housing object configuration, and thereby, changes its projected image to illuminate the new housing object.

In typical practice, the housing objects act as illumination surfaces by the projector 102 for graphic and text display. Moreover, the housing objects may also act as gesture and touch sensitive surfaces for interactive control of projection system 100.

The untagged housing object 122 is defined as a housing object that has no visual tag, marker, or graphic identifier on or within its body. So when the housing object 122 is physically altered in its shape, the object detection module 112 detects the current position of the housing object 122. Typically, an image sensor or proximity sensor having a field of view detects the change in the housing and provides a position change signal to the control unit 104. Hence the transformable projection system 100 is context aware of its current physical configuration and responds appropriately.

The tagged housing object 132 is defined as a housing object that has a visual tag, barcode, marker, or graphic identifier—uniquely identifying it. FIG. 1 illustrates an identifying tag 132 shaped like a cross. Other examples of an identifying tag 132 are a spot, triangle, pattern of shapes, etc. Further, there may be multiple identifying tags 132 delineating multiple regions on the tagged housing object 132. When the tagged housing object 132 is physically altered in its shape, the object identification module 112 identifies the current position of the various regions of the tagged housing object 132. Preferably, a camera-based tag reader is used for tag detection since it provides excellent positional resolution of the graphic tags or barcodes. Hence the transformable projection system 100 is context aware of its current physical configuration and responds to the user's needs.

The active housing object 142 is defined as a housing object that can electronically communicate with subsystem 101. An RFID tag, IrDA marker, RF transceiver, or ultrasonic emitter is typically embedded in the active housing object 142. Whereby, not only can the active housing object 142 convey the kind of object it represents, through a transmitted ID message, but may carry on a two-way conversation exchanging data attributes and functional behavior.

The active housing object 142 may contain many or few electronic components, depending on required needs. As shown in FIG. 1, the active housing object 142 contains an object control unit 144, such as a microcontroller.

In addition, an object data transceiver 154 is operably coupled to object control unit 144. The object data transceiver 154 may utilize modulated RF, invisible or visible light, ultrasonic sound, or other means of communication. The object data transceiver 154 provides a data link to the data transceiver 110, other remote devices and objects.

Object data memory 148 may be provided, such as RAM or ROM, and is operably coupled to object control unit 144.

An object power source 146 provides the electrical power for all of the electronic components of the active housing object 142. The object power source 146 may be a battery, rechargeable pack, power cord, or RF antenna as used in an RFID tag.

Keep in mind the control unit 144, memory 148, and power source 146 may be unneeded, as projection subsystem 101 could provide these resources using the plug-in interface of data transceiver 110. That is, a wired cable would operatively connect object data transceiver 154 to data transceiver 110.

A Transformable Projection System with Remote Objects

Figure 2:
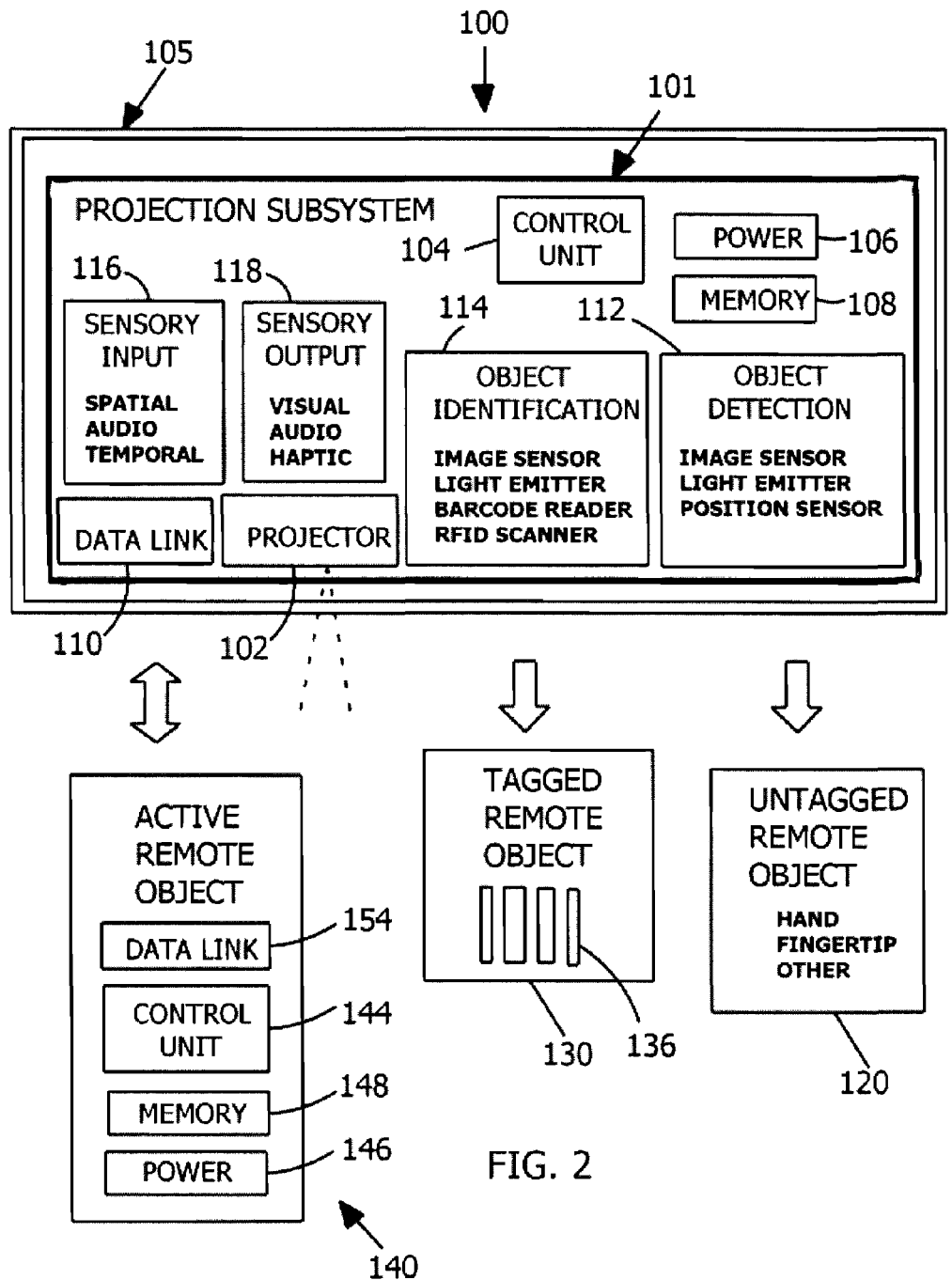
FIG. 2 is a block diagram of the transformable projection system, along with three kinds of remote objects.

Turning to FIG. 2, thereshown is a block diagram of the transformable projection system 100 with some remote objects in its vicinity. Since this block diagram shows many of the same components as described earlier in FIG. 1, similar reference numerals for similar parts are used throughout the discussion.

System 100 is surrounded by the transformable housing 105, with previously shown housing objects collapsed and stored away. Further, projection subsystem 101 is comprised of the control unit 104, power source 106, memory 108, object detection module 112, object identification module 114, data transceiver 110, projector 102, sensory input module 116, and sensory output module 118.

Definition of Remote Objects

Shown in the lower half of FIG. 2 are a few remote objects detectable by projection subsystem 101. Remote objects are defined as all objects, elements, or surfaces that are external of the transformable projection system 100 and unattached to its housing 105. The family of remote objects include things like a human fingertip, hand, foot, wall picture, floor mat, mail package, inter-continental storage container, stick-on button, full-size passenger vehicle, toy car, or rubber ball. As may be noted, the kinds of detectable objects are immensely varied in size and function. Whereby, other kinds of remote objects are fully considered as being within the scope of the present invention. There are three kinds of detectable remote objects: an untagged remote object 120, tagged remote object 130, and active remote object 140.

The untagged remote object 120 is defined as an object that has no visual tag or encoded identifier on or within its body, nor an electronic means to communicate. Examples of untagged remote objects include the fingertip, human torso, pet dog, magazine page, apple, wall picture, or balloon.

The tagged remote object 130 is defined as any object that has a visual tag, barcode or encoded identifier—uniquely identifying the object. As such, the tagged remote object 130 is identifiable by subsystem 101 using its object identification module 114. The tagged remote object 130 does not rely on any electronic communication to identify itself. As shown, an identifying tag 136 has a barcode pattern, but may be any kind of visual shape or pattern. Examples of tagged remote objects 30 include a magazine page with a graphic barcode, a pet dog with a tagged collar, a credit card with a magnetic barcode, or a wall picture having a hidden graphic tag.

The active remote object 140 is defined as any object that can electronically communicate with the transformable projection system 100. An object having an RFID tag or IrDA marker is an example of an active remote object 140. Not only can the active remote object 140 convey the kind of object it represents, through a transmitted ID message, but may carry on a two-way conversation exchanging data attributes and functional behavior.

Whereby, the active remote object 140 can contain many or few electronic components, depending on required needs. As shown in FIG. 2, the active remote object 10 contains an object control unit 144, such as a microcontroller.

In addition, an object data transceiver 154 is operably coupled to object control unit 144. The object data transceiver 154 may utilize modulated RF, infrared or visible light, ultrasonic sound, or other means of communication. The object data transceiver 154 provides a data link to the projection system 100, other remote devices and objects.

Object data memory 148 may be provided, such as RAM or ROM, and is operably coupled to object control unit 144.

Finally, an object power source 146 provides the electrical power for all of the electronic components of the active remote object 140. The object power source 146 may be a battery, rechargeable pack, power cord, or RF antenna as used in an RFID tag.

Family of Transformable Housing Objects

FIGS. 3A-14B show a collection of different kinds of transformable housing objects. As indicated, each transformable housing object contains or has attached the projection subsystem 101 enabling the housing to be detected, identified, and an illuminated visible image projected onto it. All of the presented transformable housings can be made of a translucent material, enabling the projected image to appear on both sides of a housing surface. Moreover, all of the presented housings can be touch sensitive, as facilitated by the associated projection subsystem 101. Keep in mind the given examples are only a sample of various transforming shapes, as other transformable housings are clearly considered as being within the scope of the present invention.

Figure 3A:
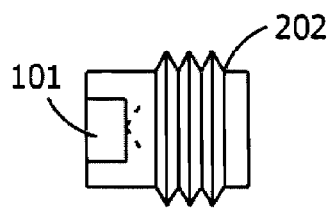
FIG. 3A is a section view of a squeezed, accordion housing.
Figure 3B:
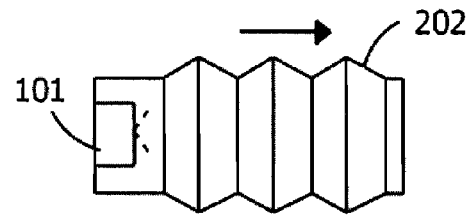
FIG. 3B is a section view of a pulled, accordion housing.

Turning first to FIGS. 3A and 3B is shown an accordion housing 202, which is tubular in shape and may be squeezed together or stretched apart. Housing 202 may be a blow-molded material made of thin, flexible plastic such as polyethylene. Whereby, the accordion like corrugations act like living hinges, such that the shape may be stretched and squished indefinitely without breakage. Finally, projection subsystem 101 illuminates the length and interior of the translucent and touch-sensitive housing 202.

Figure 4A:
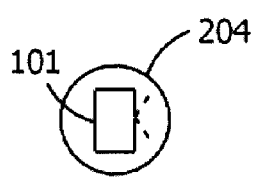
FIG. 4A is a section view of a shrunk, expandable housing.
Figure 4B:
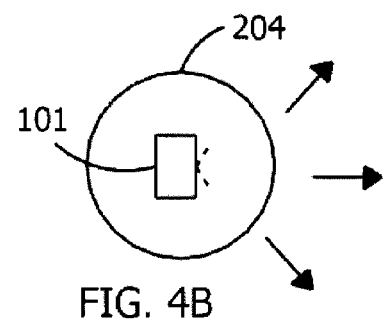
FIG. 4B is a section view of a enlarged, expandable housing.

FIGS. 4A and 4B show an expandable housing 204 that is ball shaped and may be expanded by air, liquid, or mechanical force. Housing 204 is ideally made of an elastic material, such as a latex balloon or nylon cloth. Finally, the ball shape may have a projected image of a world globe or character's face displayed on its surface and is touch sensitive.

Figure 5A:
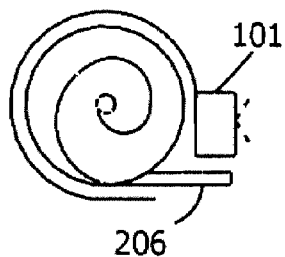
FIG. 5A is a section view of a retracted, roll-up housing.
Figure 5B:
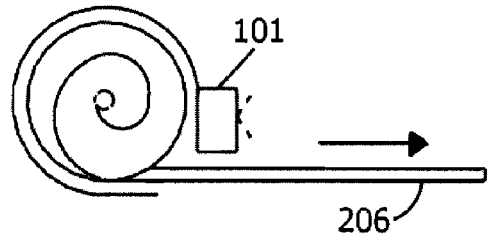
FIG. 5B is a section view of a extended, roll-up housing.

FIGS. 5A and 5B shows a roll-up housing 206, which retracts into a tight bundle. The retracting operation may rely on an auto-retract spring, much like a retracting tape measure. When the roll-up housing is extended as shown in FIG. 5B, the full length of the roll-up housing 206 is illuminated with an image and is touch sensitive.

Figure 6A:
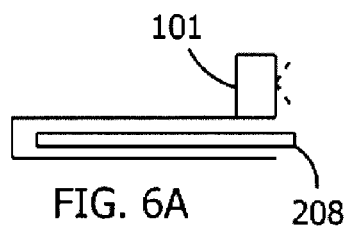
FIG. 6A is a section view of a hidden, pocket housing.
Figure 6B:
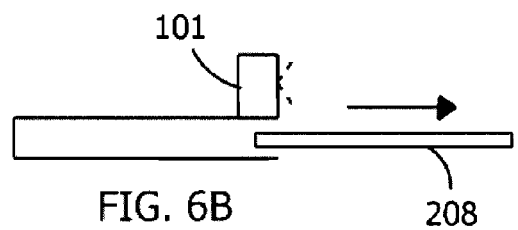
FIG. 6B is a section view of a exposed, pocket housing.

FIGS. 6A and 6B show a pocket housing 208 that is able to neatly slip into a pocket, hidden from view. But when housing 208 is pulled from its pocket in FIG. 6B, it becomes an illuminated, touch sensitive, tablet display.

FIGS. 7A and 7B show a telescoping housing 212 that is able to collapse and expand like a telescoping radio antennae. The housing 212 may be made of rigid metal or plastic. Further, the housing 212 is tipped with a display tip 216 and made of such things as soft, foam rubber or paper. The display tip 216 can be illuminated by projection subsystem 101 and animated with perhaps orange flames or a grimacing face.

FIGS. 8A and 8B show a tethered housing 222 that cantilevers outward from projection subsystem 101. Tied to the tip of housing 222 is a filament 224 with a tethered object 220 dangling from it. The filament 224 can be made of a nylon string, steel cable, thin plastic or paper streamer, etc. Examples of tethered objects 220 include a balloon, parachute, yo-yo, plastic fish, kite, etc. The tethered object 220 may contain a light projected image created by subsystem 101.

FIGS. 9A and 9B show a foldable housing 228 that is able to fold into a compact shape and unfold into a rigid structure. When the housing 228 is unfolded, its surface is illuminated and is touch sensitive. Understandably, other oragami-like, fold out shapes are clearly contemplated as being within the scope of the present disclosure.

FIGS. 10A and 10B show an inverting housing 240 that is curve shaped and can be inverted, or pulled inside out. FIG. 10A shows a convex curve facing the projection subsystem 101, while FIG. 10B shows a concave curve facing the projection subsystem 101. To manually invert the curve, a user pulls or pushes at the ends of the inverting housing 240, causing the curve to invert. The inverting housing may constructed as a curved strip or a 3-D bowl shape. Again, the housing 240 may be fully illuminated and touch sensitive.

Figure 11A:
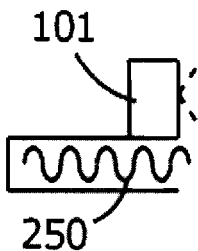
FIG. 11A is a section view of a stored, membrane housing.
Figure 11B:
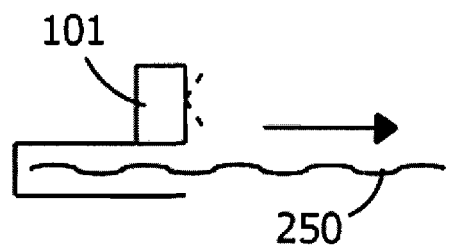
FIG. 11B is a section view of a expanded, membrane housing.

FIGS. 11A and 11B show a membrane housing 250 that can be squashed up into a compact wad, and likewise, unpacked into a flexible sheet. Housing 250 may be a thin, flexible plastic sheet material, paper, or cloth—and illuminated with a touch-sensitive image.

Figure 12A:
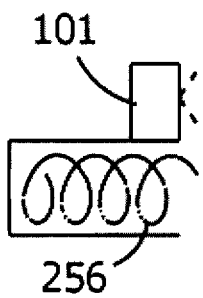
FIG. 12A is a section view of a compressed, spring housing.
Figure 12B:
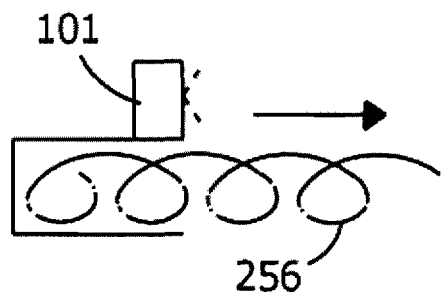
FIG. 12B is a section view of an expanded, spring housing.

FIGS. 12A and 12B show a spring housing 256 that can be compressed together and stored away, or when released, expands outward. The housing 256 may be made of plastic or steel, much like a Slinky toy. Further, the thin, spiraling spring surfaces may be illuminated by projection subsystem 101.

Figure 13A:
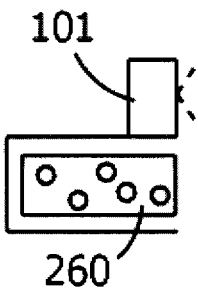
FIG. 13A is a section view of a squished, elastic housing.
Figure 13B:
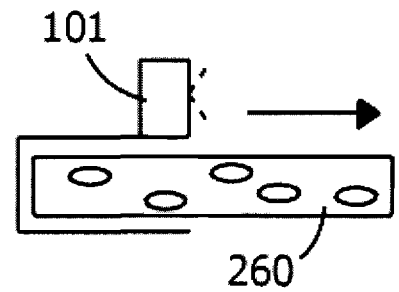
FIG. 13B is a section view of a released, elastic housing.

FIGS. 13A and 13B show an elastic housing 260 that can be compressed and stored away, or when released, expands outward. The housing 260 may be made of foam rubber, expanded urethane, etc. The housing 260 may be illuminated by subsystem 101. Moreover, if the elastic material is not substantially thick, the housing 260 surface may be touch sensitive.

Figure 14A:
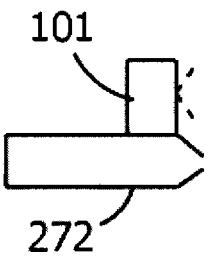
FIG. 14A is a section view of a turned off, spray housing.
Figure 14B:
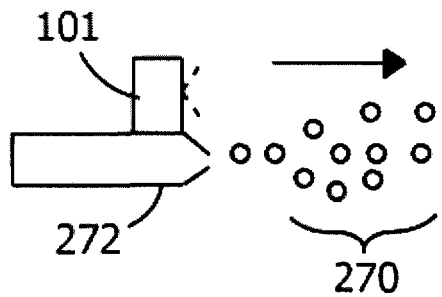
FIG. 14B is a section view of a turned on, spray housing.

FIGS. 14A and 14B show a spray housing 272 that can spray particles 270 outward from the projection subsystem 101. The particles 270 may be liquid droplets, confetti, or reflective flakes. Further, the spray particles may be illuminated by subsystem 101.

Detection of Housing Configuration and Position

Thereshown in FIGS. 15A-25, 57A-59B are various mechanisms that may be used by the projection subsystem 101 to detect the configuration and position of a transformable housing object. The mechanisms may be used in whole, part, or combination for some embodiments of the present invention.

FIGS. 57A-59B show an untagged housing object 122 that is moveable and electronically detectable by projection subsystem 101 having a user-actuated input device. Turning specifically to FIG. 57A is a top view of an untagged housing object 122 and FIG. 57B is a side view, where housing object 122 is a flat panel of molded, translucent plastic.

FIGS. 58A and 58B show housing object 122 positioned atop subsystem 101 containing projector 102. In addition, a user-actuated input device 302 is operatively coupled to the control unit (not shown) of subsystem 101. Examples of user-actuated input devices 302 include a keypad, pushbutton switches, touch sensitive panel, camera, etc.

Then turning to FIGS. 59A and 59B, the housing object 122 has been manually moved or extended outward. Moreover, in FIG. 59A, a user indicates to the projection subsystem 101 the current state of the housing configuration. A user finger 304 touches input device 302, which generates a housing condition signal (indicating housing is "extended") for the control unit (not shown). Thus the housing configuration, along with a pre-defined housing position HP, is detected by subsystem 101.

When housing object 122 is extended as shown in FIGS. 59A and 59B, projector 102 may be activated, illuminating housing object 122 with a visible image (not shown). Moreover, subsystem 101 may alter its projected image to correspond to the shape, orientation, and position of housing object 122 relative to subsystem 101.

Figure 24:
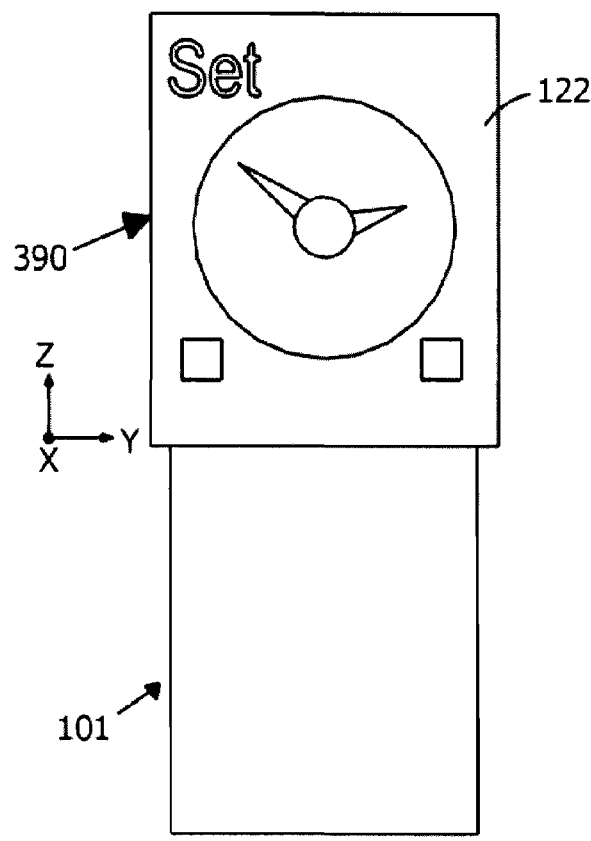
FIG. 24 is a top view of projection subsystem with a housing containing an illuminated image.
Figure 25:
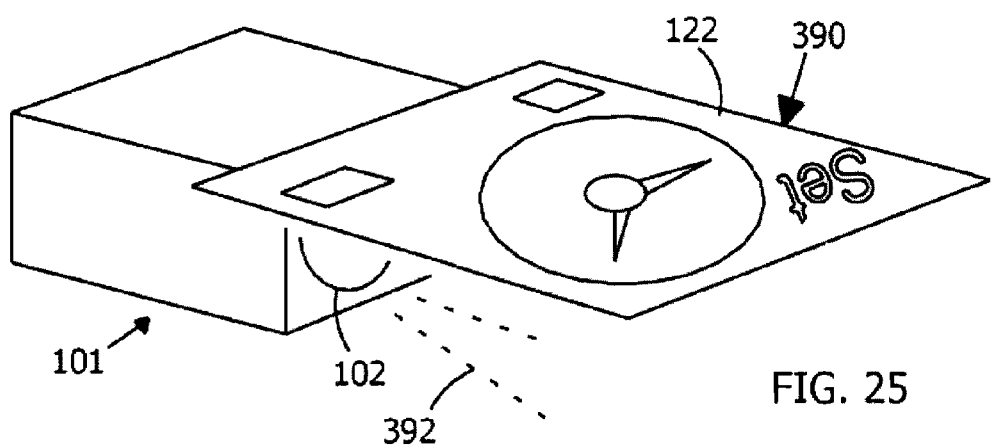
FIG. 25 is a perspective view of projection subsystem with a housing containing an illuminated image.

The result, as shown in FIG. 24 and 25, is subsystem 101 having projector 102 shine a light beam 392 onto the underside of housing object 122. Since housing object 122 is translucent, an illuminated image 390 of a clock appears to user. Understandably, multiple housing configurations are detectable by the user-actuated input device as well.

FIGS. 15A-17D describe an untagged housing object 122 that is moveable and electronically detectable by projection subsystem 101 having a position sensor. Turning specifically to FIG. 15A is a top view of untagged housing object 122 and FIG. 15B is a side view, where housing object 122 is a flat panel of molded, translucent plastic. Fixed to the housing object 122 is a housing indicator 322 that acts as a position reference.

FIGS. 16A and 16B show housing object 122 positioned atop subsystem 101 containing projector 102. Specifically, FIG. 16B shows a side view with a position sensor 324 that remains fixed relative to subsystem 101. The position sensor 324 is operatively coupled to the control unit (not shown) in subsystem 101. Examples of position sensors 324 include a contact switch, proximity sensor, hall-effect sensor, electric field sensor, etc.

Then turning to FIGS. 17A and 17B, housing object 122 has been manually moved outward, thereby, activating positional sensor 324 and generating a position change signal operatively read by the control unit (not shown) in subsystem 101. Thus housing position HP may be determined by subsystem 101.

Keep in mind that various kinds of position sensors 324 may be considered for some embodiments of the present invention, such as but not limited to a contact switch and proximity sensor. As an example, if position sensor 324 is a contact switch, an off/on signal shown in FIG. 17C is created as housing object 122 is moved (shown in FIGS. 16A and 17A). If position sensor 324 is a proximity sensor, a gradient signal shown in FIG. 17D is created as housing object 122 is moved (shown in FIGS. 16A and 17A).

When housing object 122 is extended as shown in FIGS. 17A and 17B, projector 102 may be activated, illuminating housing object 122 with a visible image (not shown). Moreover, subsystem 101 may alter its projected image to correspond to the shape, orientation, and position of housing object 122 relative to subsystem 101.

The result, as shown in FIG. 24 and 25, is subsystem 101 having projector 102 shine a light beam 392 onto the underside of housing object 122. Since housing object 122 is translucent, an illuminated image 390 of a clock appears to user.

FIGS. 18A-20B describe an untagged housing object 122 that is moveable and electronically detectable by projection subsystem 101 having an electronic camera. Turning specifically to FIG. 18A is a top view of untagged housing object 122 and FIG. 18B is a side view, where housing object 122 is a flat panel of molded, translucent plastic.

FIG. 19A shows housing object 122 positioned atop subsystem 101 that includes a projector 102, image sensor 352, and illuminating emitter 354. The projector 102, image sensor 352, and illuminating emitter 354 are all operatively coupled to the control unit (not shown) in subsystem 101. Preferably, image sensor 352 is a CMOS camera and is sensitive to infrared light. Further, the illuminating emitter 354 emits infrared light so that the CMOS camera view is consistently lit in unknown lighting conditions. As shown in FIG. 19B, the resulting image sensor background view 360 is uniformly lit, devoid of any present objects.

Then turning to FIG. 20A, housing object 122 has been manually moved outward and extended. Whereby, the movement of housing object 122 is now detectable by image sensor 352, which generates a view change signal for the control unit (not shown) in subsystem 101. Thus housing position HP may be determined by subsystem 101. As shown in FIG. 20B, the resulting image sensor background view 360 remains uniformly lit, but also includes a visible portion of the untagged housing object 122.

When housing object 122 is extended as shown in FIG. 20A, projector 102 may be activated, illuminating housing object 122 with a visible image (not shown). Moreover, subsystem 101 may alter its projected image to correspond to the shape and position of the housing object 122 relative to subsystem 101.

The result, as shown in FIGS. 24 and 25, is subsystem 101 having projector 102 shine a light beam 392 onto the underside of housing object 122. Since housing object 122 is translucent, an illuminated image 390 of a clock appears to user.

FIGS. 21A-23B describe a tagged housing object 132 that is moveable and electronically detectable by projection subsystem 101 having an electronic camera. Turning specifically to FIG. 21A is a top view of tagged housing object 132 and FIG. 21B is a side view, where housing object 132 is a flat panel of molded, translucent plastic having identifying tags 136. The identifying tags 136 may be of any shape or pattern, and molded, stamped, or printed on the surface of tagged housing object 132. The tags 136 act as a visual reference.

FIGS. 22A show housing object 132 positioned atop subsystem 101 that includes a projector 102, image sensor 352, and illuminating emitter 354. The projector 102, image sensor 352, and illuminating emitter 354 are all operatively coupled to the control unit (not shown) in subsystem 101. Preferably, image sensor 352 is a CMOS camera and is sensitive to infrared light. Further, the illuminating emitter 354 emits infrared light so that the CMOS camera view is consistently lit in unknown lighting conditions. Moreover, subsystem 101 contains a camera-based tag reader 355 to locate and identify visual tags, barcodes, and markers. The camera-based tag reader 355 is comprised of image sensor 352 and illuminating emitter 354. As shown in FIG. 22B, the resulting image sensor background view 360 is uniformly lit, devoid of any present objects.

Then turning to FIG. 23A, housing object 132 has been manually moved outward and extended. Whereby, the movement of housing object 132 is now detectable by image sensor 352, which generates a view change signal for the control unit (not shown) in subsystem 101. Thus housing position HP may be determined by subsystem 101. As shown in FIG. 23B, the resulting image sensor background view 360 remains uniformly lit, but also includes a visible portion of the tagged housing object 132 and its identifying tags 136.

When housing object 122 is extended as shown in FIGS. 23A, projector 102 may be activated, illuminating the housing object 122 with a visible image (not shown). Moreover, subsystem 101 may alter its projected image to correspond to the shape and position of the housing object 122 and its identifying tags 136 relative to subsystem 101.

The result, as shown in FIG. 24 and 25, is subsystem 101 having projector 102 shine a light beam 392 onto the underside of housing object 132. Since housing object 132 is translucent, an illuminated image 390 of a clock appears to user.

Operation of Object Aware, Transformable Projection System

Figure 26:
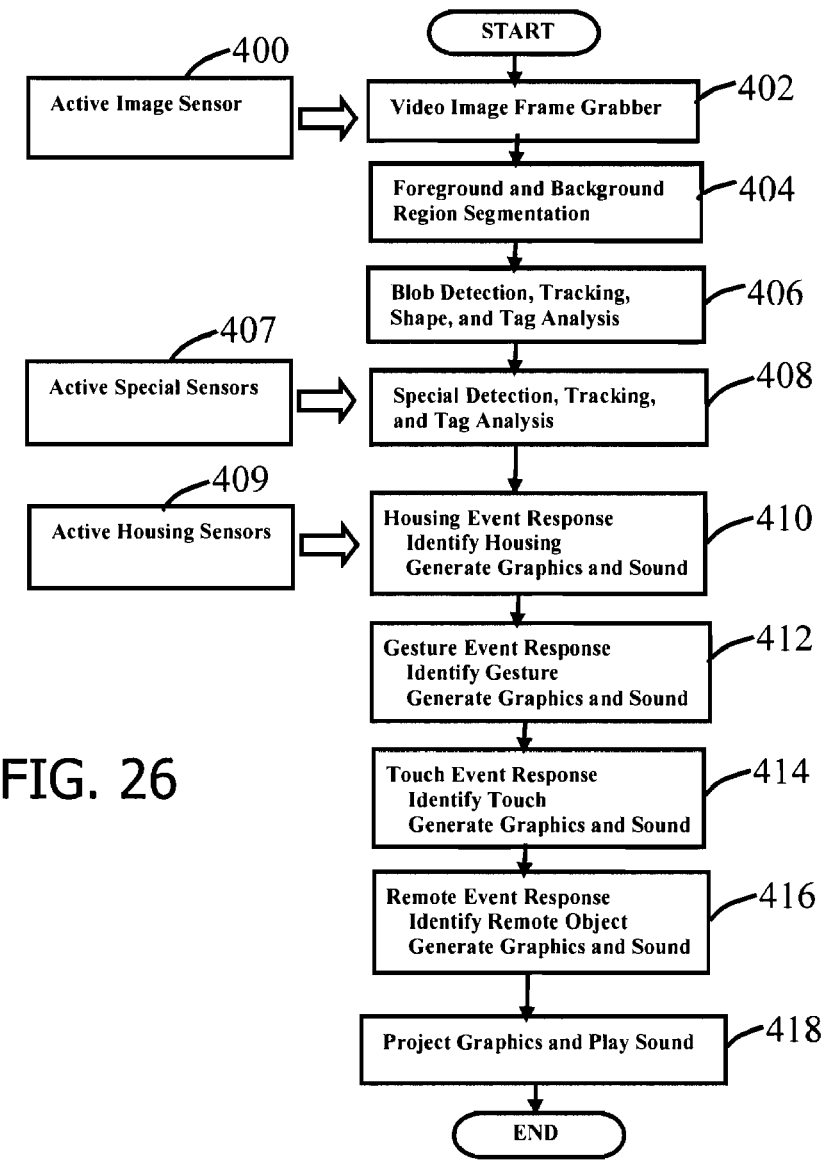
FIG. 26 is a high-level flow diagram of a method to operate the object aware, transformable projection system.

The disclosed computer flow diagrams of FIGS. 26-30 and 41-44 may be utilized by various embodiments of the present invention, such as the earlier discussed system 100 having control unit 104 and memory 108 of FIGS. 1 and 2. Thereshown in FIG. 26 is a high-level flow diagram of the operation of the transformable projection system (shown earlier as system 100 in FIGS. 1 and 2). If the system is comprised of an electronic camera (such as subsystem 101 of FIGS. 1 and 2), steps 400-406 have been included in FIG. 26, along with many additional figures describing image processing steps for the present disclosure.

Starting with steps 400 and 402, a video image frame grabber retrieves a current image frame from the system's camera image sensor. A "frame" is defined as a digital image residing in system memory, such as a bitmap image held in memory.

In step 404, the current image frame is then passed on to the foreground and background segment module. The segment module takes the current image frame and generates a segmented image frame having regions of interest. Typically an edge detection algorithm known in the art is used to divide the current image frame into flat, polygon shaped regions based on light intensity.

The segmented image frame is then analyzed for meaningful regions of interest referred to as blobs. A "blob" is defined as a flat, polygon shaped region having pixels of similar brightness usually on a darker background. In step 406, the control unit locates the blobs and tracks their movement. In addition, each blob shape is analyzed to determine if the blob represents a tag or barcode.

In steps 407 and 408, special sensors may be present within the projection system, which are read and processed by the control unit. Examples of special sensors are RFID scanner, laser-based barcode reader, RF/IrDA data transceiver, accelerometers, GPS, etc. The special sensors enhance the object and spatial awareness of some embodiments of the present invention. Moreover, the information gathered from the special sensors may be used for object detection, tracking, and tag reading.

Then in steps 409 and 410, a housing event response is given by the system. That is, the housing sensors are read and processed by the system's control unit, learning the configuration and position of various housing objects. If the system detects a housing object forward of the projector, the system responds by creating graphics and sound data related to the housing configuration for subsequent playback.

In step 412, a gesture event response is given by the system. If the system detects a nearby hand or finger gesture, the system responds by creating graphics and sound data related to the gesture for subsequent playback.

In step 414, a touch event response is given by the system. If the system detects a finger touch, the system responds by creating graphics and sound data related to the finger touch for subsequent playback.

In step 416, a remote event response is given by the system. If the system detects a remote object, the system responds by creating graphics and sound data related to the remote object for subsequent playback.

Finally, in step 418, the system takes the preceding generated graphic and sound data and passes it on to the projector for display and sound synthesizer for playback.

Operation of Video Image Frame Grabber

Figure 27:
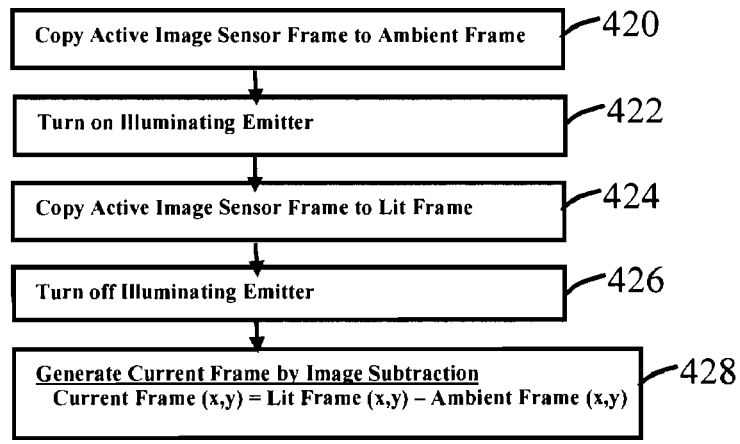
FIG. 27 is a flow diagram of a method to take a snapshot view of housing and remote objects forward of the image sensor.

Thereshown in FIG. 27 is a flow diagram for the video image frame grabber, which enables the system to view or perceive the projected display area, forward of the projector. First, a digital snapshot is made by the image sensor, such as an infrared-sensitive CMOS camera. That is, in step 420 the active image sensor frame is copied to an ambient frame. The ambient frame contains ambient light. Then in step 422, an infrared illuminating emitter is turned-on by the control unit. Then another snapshot is made in step 424, where active image sensor frame is copied to a lit frame. In step 426, illuminating emitter is turned off.

Finally, in step 428 the current frame is generated by digital image subtraction, where the ambient frame is subtracted from the lit frame. The result being, the current frame has no ambient light in its content. However, if its found ambient light conditions do not adversely affect the system, steps 422-428 could be skipped, and the ambient frame of step 420 could be copied directly to the current frame.

Operation of Foreground/Background Segmentation

Figure 28:
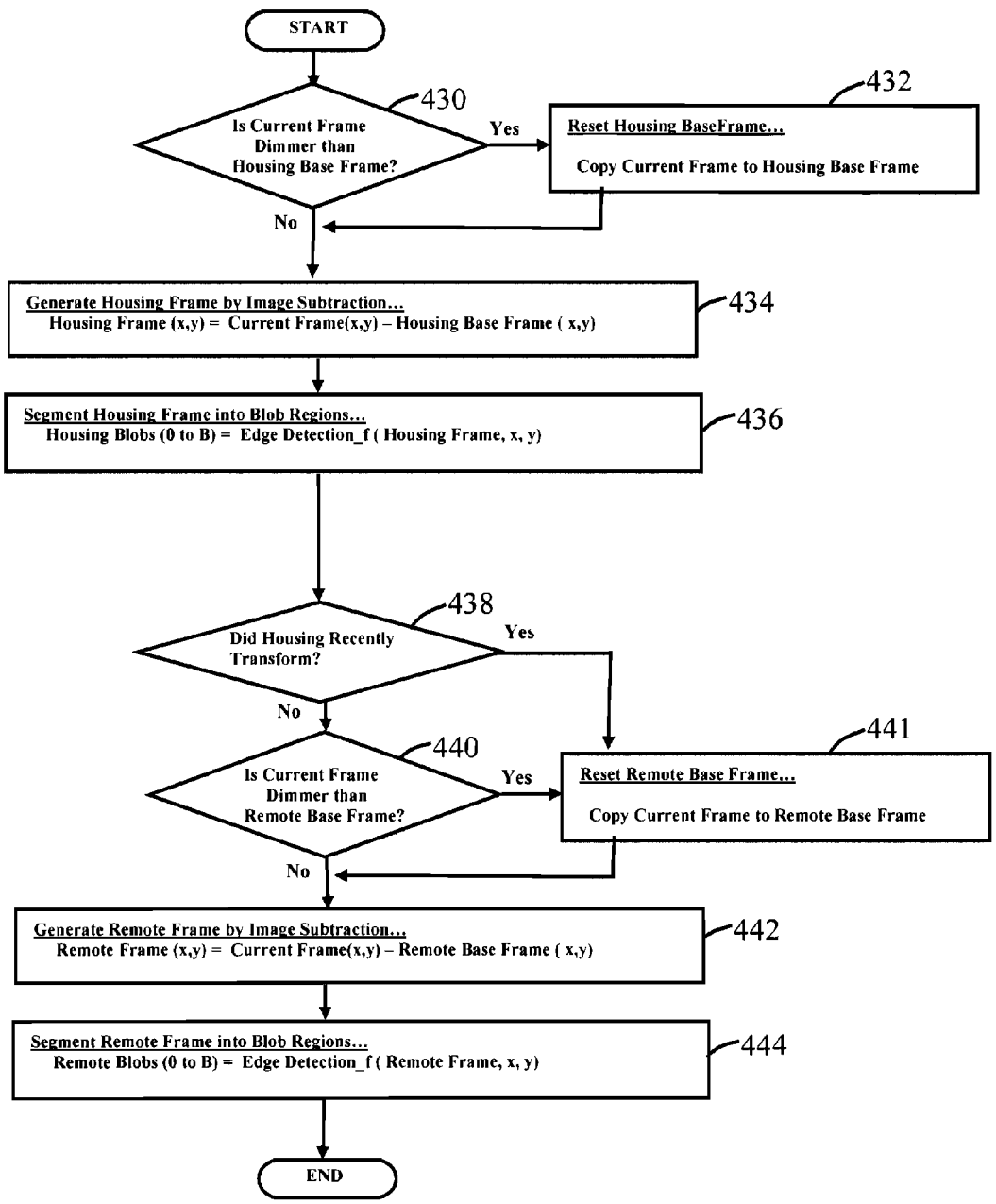
FIG. 28 is a flow diagram of a method to segment the image sensor's view into housing blobs and remote blobs.

Thereshown in FIG. 28 is a flow diagram for segmenting the foreground regions from the background regions. Further, the transformable projection system is capable of detecting both housing objects and remote objects. As a result, the system may maintain "before and after" image snapshots so that it can discern the many various physical changes forward of the image sensor. So an interesting feature of the current embodiment is that two base frames ("before" snapshots) may be maintained in memory. A housing base frame is an image devoid of all housing objects. A remote base frame is an image devoid of all gesture, touch, and remote objects.

So turning first to step 430, if the current frame is dimmer in light intensity than the housing base frame, then the housing base frame is reset with the current image frame in step 432. A technique in comparing overall brightness of two frames is, $$\Sigma F_1(x,y) < \Sigma F_2(x,y)$$

where a set or subset of pixel intensity values of each frame F are summed together and then compared.

In step 434, using digital image subtraction, the housing base frame is subtracted from the current frame, producing a housing frame. The housing frame is a view of the actively observed housing objects.

In step 436, the housing frame is then segmented into foreground and background regions. Typically this is accomplished using an edge detection function turning an image into polygon shaped regions based on their light intensity. The most brightly-lit regions are the actively observed housing objects, and identified as housing blobs.

In step 438, if the housing configuration is changed, or in step 440, if the current frame is dimmer in light intensity than the remote base frame, then the remote base frame is reset with the current frame in step 441.

In step 442, again using digital image subtraction, the remote base frame is subtracted from the current frame, producing a remote frame. The remote frame is a view of the actively observed gestures, touches, and remote objects.

Finally, in step 444, the remote frame is segmented into foreground and background regions. Typically this is accomplished using an edge detection function turning an image into polygon shaped regions. The most brightly-lit regions are assumed to be actively observed gestures, touches, or remote objects, all identified as remote blobs.

Operation of Housing Blob Detection and Identification

Figure 29:
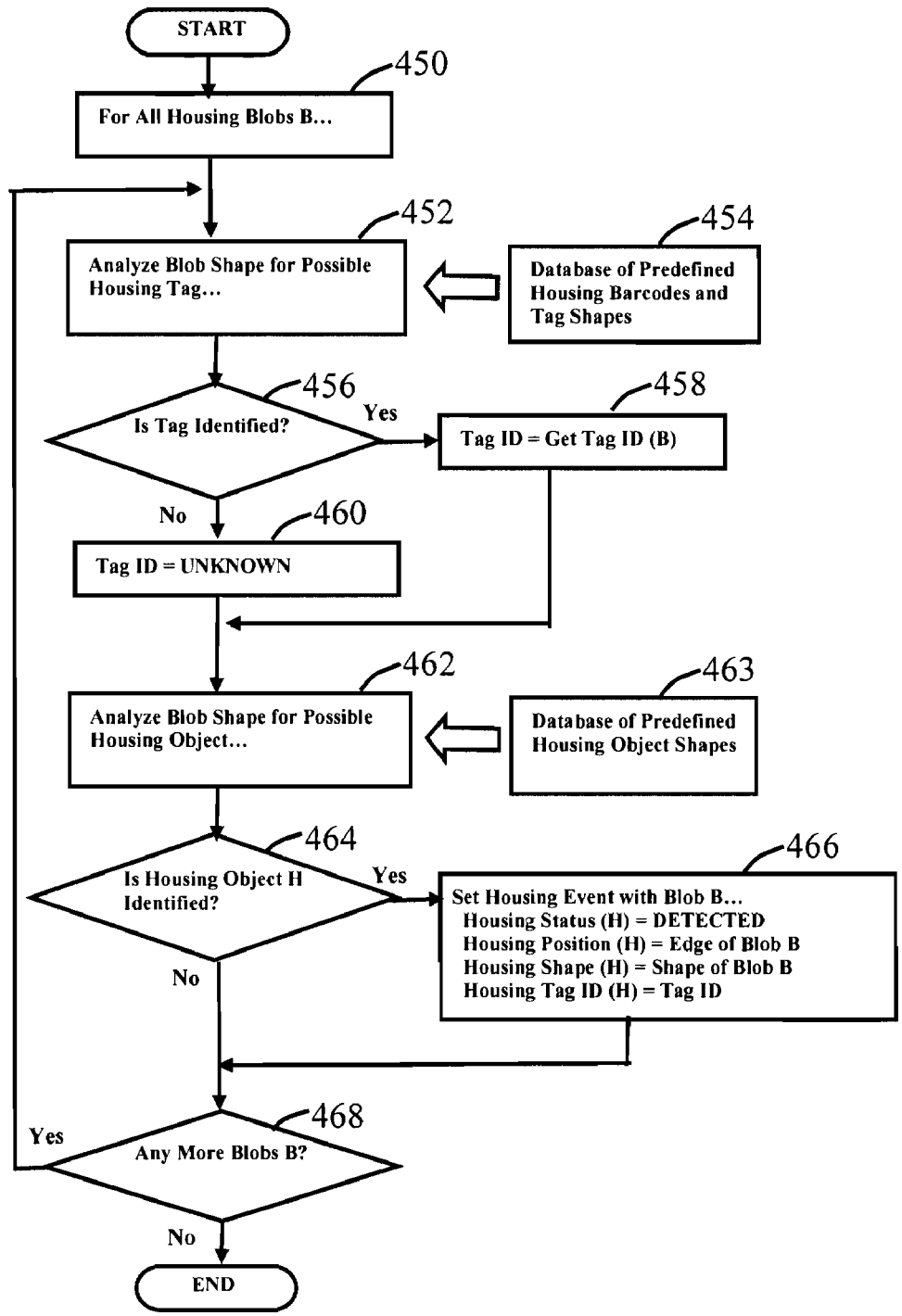
FIG. 29 is a flow diagram of a method to analyze the housing blobs for a tag or housing object—and set a housing event if detected.

Turning now to FIG. 29 is a flow diagram of housing blob detection, tracking, and identification. In step 450, all housing blobs will be processed, starting with the first housing blob B.

Then in step 452, the shape of the housing blob B is analyzed to determine if the blob is a housing tag or barcode. That is, the blob shape is compared against all of the known housing tag and barcode shapes contained in a database, defined in step 454. Shape comparison is typically done in the art by functions such as Hausdorff distance, Hamming distance, neural networks, etc.

In step 456, if the blob B is a tag or barcode, the tag id is retrieved in step 458. If the blob is not a tag, the tag id is set to unknown in step 460.

Then in step 462, the shape of the blob is analyzed to determine if it's a housing object. That is, the blob shape is compared against all of the known housing object shapes, defined in step 463.

In step 464, if the blob B is a known housing object, then convert blob B into housing event H status, position, etc. in step 466. An "event" is defined as a set of data attributes (e.g. status, position, shape, ID, etc.) that is managed by the control unit. Finally in step 468, if any more housing blobs B exist, then process the next blob B in step 452.

Operation of Housing Event Response

Figure 30:
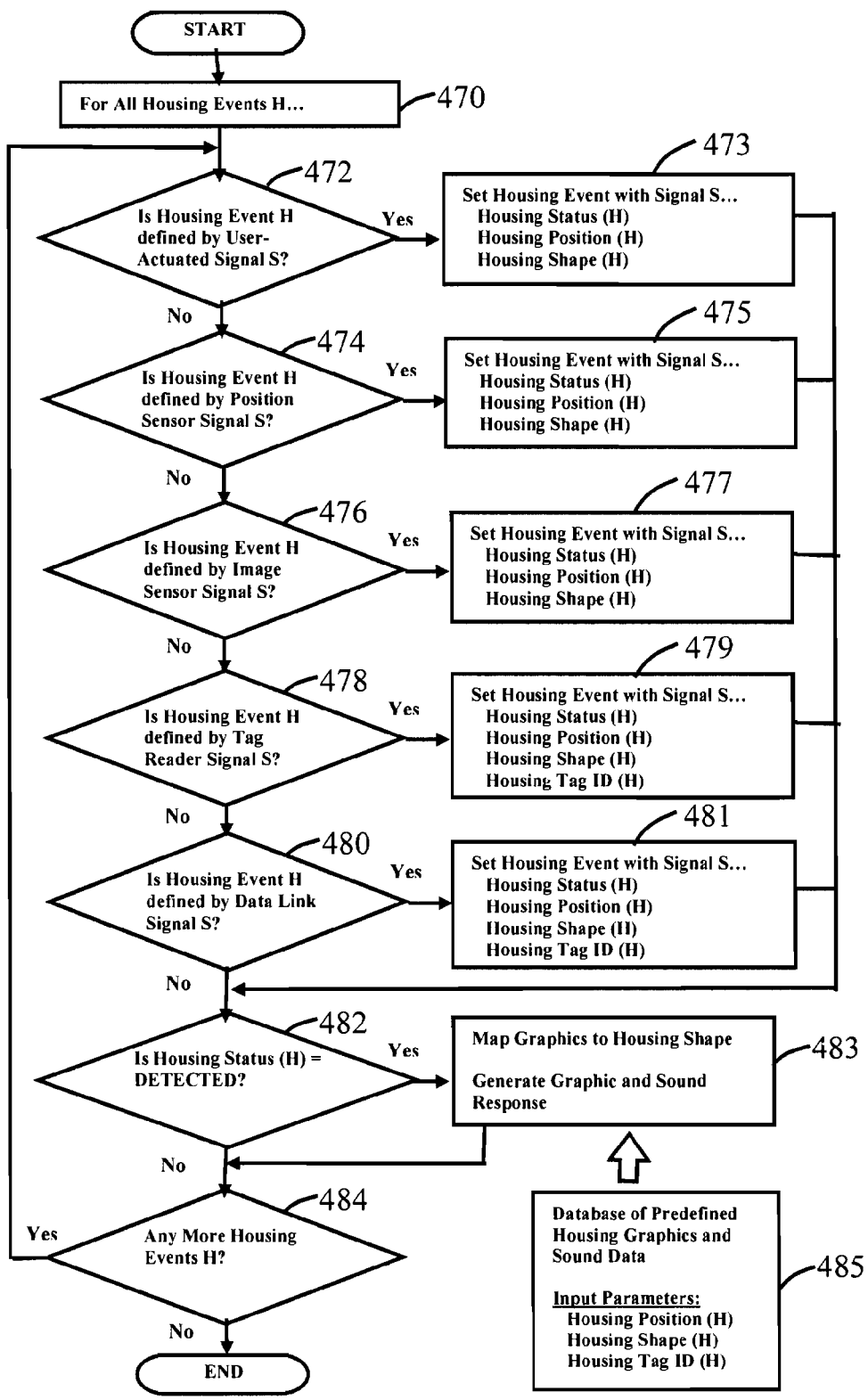
FIG. 30 is a flow diagram of a method to analyze the housing sensors and signals for a housing object—and set a housing event if detected.

Thereshown in FIG. 30 is a flow diagram for an operational response to the current housing configuration of the transformable projection system. Starting with step 470, all housing events will be processed, starting with the first housing event H.

In step 472, if housing event H is designated by a user-actuated signal S, then convert signal S into housing event H status, position, shape, etc. in step 473. The source of signal S is from a user-actuated input device (e.g. keypad, touch control, camera, etc.) operatively coupled to the system's control unit. That is, the user selects the housing object that is in view by appropriately actuating the input device. Signal S from the input device then electronically notifies the system that the selected housing object is in view.

In step 474, if housing event f1 is designated by a position sensor signal S, then convert signal S into housing event H, in step 475. The source of signal S is from a position sensor that electronically notifies the system when an untagged housing object is in view.

In step 476, if housing event H is designated by an image sensor signal S, then convert signal S into housing event H, in step 477. The source of signal S is from an image sensor that electronically notifies the system when an untagged housing object is in view. (This step was discussed in detail in FIG. 29.)

In FIG. 30 and step 478, if housing event H is designated by a tag reader signal S, then convert signal S into housing event H, in step 479. The source of signal S is from a tag reader that electronically notifies the system when a tagged housing object is in view.

In step 480, if housing event H is designated by a data transceiver signal S, then convert signal S into housing event H, in step 481. The source of signal S is from a data transceiver that electronically notifies the system when an active housing object is in view.

In step 482, if housing event H indicates a housing object was detected, then map graphic data to the corresponding housing position, shape, and tag, as defined in step 483. Further, generate a graphic and sound response for subsequent playback. In step 485, a database of pre-defined housing graphic and sound data is provided.

Finally in step 484, if any more housing events H exist, then process the next housing event H in step 472.

Detection of Hand or Finger Gesture

Turning now to FIGS. 31A-33B a mechanism is shown to detect a hand or finger gesture near the transformable projection system using an electronic camera. FIG. 31A illustrates an untagged housing object 122 positioned atop the projection subsystem 101, which includes projector 102, image sensor 352, and illuminating emitter 354. The projector 102, image sensor 352, and illuminating emitter 354 are all operatively coupled to the control unit (not shown) in subsystem 101.

Preferably, image sensor 352 is a CMOS camera and is sensitive to infrared light. Further, the illuminating emitter 354 emits infrared light so that the CMOS camera view is consistently lit in changing lighting conditions. As shown in FIG. 31B, the resulting image sensor background view 360 is uniformly lit with a visible portion of the housing object 122.

Then turning to FIG. 32A, a human finger 504 is positioned next to the housing object 122, where housing object 122 resides between the finger 504 and image sensor 352. Finger 504 is at gesture point GP and is making a gesture movement through space. As shown in FIG. 32B, the resulting image sensor background view 360 remains uniformly lit. However, within the housing object 122 region is a fairly bright region of finger 504. As a result, finger 504 is detectable by image sensor 352, which generates a view change signal for the control unit (not shown) in subsystem 101. Hence subsystem 101 locates the sensor gesture position SGP on sensor background view 360 and tracks its movement for gesture analysis.

If subsystem 101 detects a meaningful finger or hand gesture, the projector 102 may be activated, illuminating housing object 122 with a visible image (not shown). Moreover, subsystem 101 may alter its projected image to correspond to the gesture position GP relative to subsystem 101.

The result, as shown in FIG. 24 and 25, is subsystem 101 having projector 102 shine a light beam 392 onto the underside of housing object 122—so that an illuminated image 390 of a clock appears.

Figure 33A:
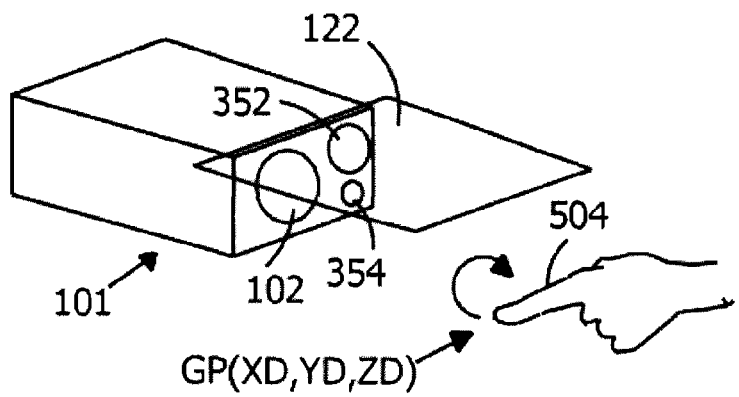
FIG. 33A is a perspective view of projection subsystem and an untagged housing, with a finger gesture below the housing.
Figure 33B:
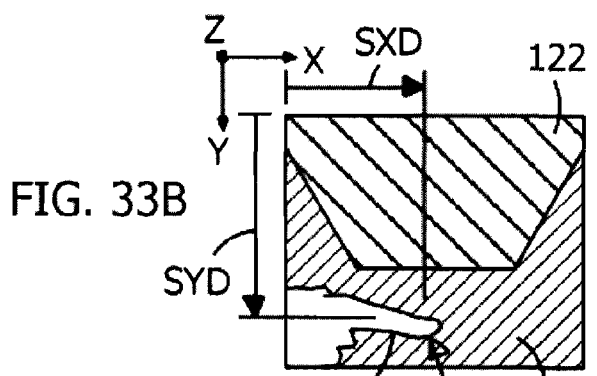
FIG. 33B is an image sensor view of an untagged housing, with a finger gesture.

As shown in FIG. 33A, a human finger 504 is positioned away from housing object 122, such that nothing resides between finger 504 and image sensor 352. Finger 504 is at gesture point GP and is making a gesture movement through space. As shown in FIG. 33B, the resulting image sensor background view 360 remains uniformly lit. But below the housing object 122 region is a bright region of finger 504. As a result, finger 504 is detectable by image sensor 352, which generates a view change signal for the control unit (not shown) in subsystem 101. Hence subsystem 101 may locate the sensor gesture position SGP on sensor background view 360 and track its movement for gesture analysis. Moreover, subsystem 101 can track multiple gesture positions SGP for multi-gesture interactivity.

If subsystem 101 detects a known finger or hand gesture, the projector 102 may be activated, illuminating housing object 122 with a visible image (not shown). Moreover, subsystem 101 may alter its projected image to correspond to the gesture position GP relative to subsystem 101.

The result, as shown in FIG. 24 and 25, is subsystem 101 having projector 102 shine a light beam 392 onto the underside of housing object 122—so that an illuminated image 390 of a clock appears.

Detection of Fingertip Touch

Figure 34A:
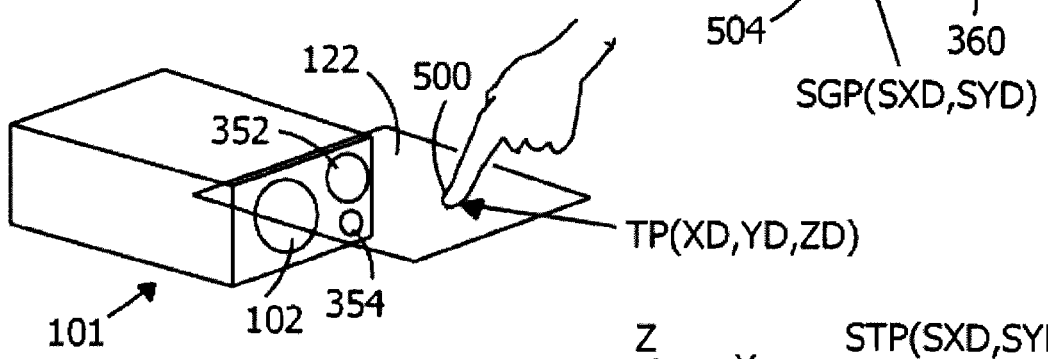
FIG. 34A is a perspective view of projection subsystem and an untagged housing, with a finger touching the housing.
Figure 34B:
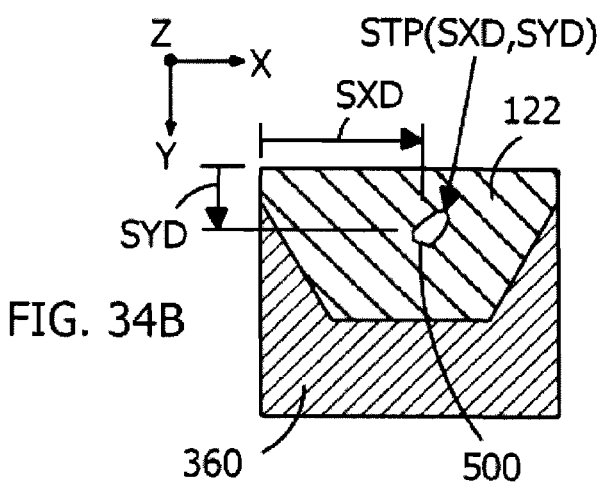
FIG. 34B is an image sensor view of an untagged housing, with a finger touch.

Now turning to FIG. 34A, a human fingertip 500 is touching the housing object 122, where housing object 122 resides between the fingertip 500 and image sensor 352. Fingertip 500 is at touch point TP, the point of contact. Turning to FIG. 34B, the resulting image sensor background view 360 remains uniformly lit. However, within the housing object 122 region is an extremely bright region of fingertip 500. As a result, the fingertip 500 touch is detectable by image sensor 352, which generates a view change signal for the control unit (not shown) in subsystem 101. Hence subsystem 101 may locate the sensor touch position STP on sensor background view 360 and track its movement for touch analysis. Moreover, subsystem 101 can track multiple touch positions STP for multi-touch interactivity.

If subsystem 101 detects a known finger touch, the projector 102 may be activated, illuminating housing object 122 with a visible image (not shown). Moreover, subsystem 101 may alter its projected image to correspond to the touch position TP relative to subsystem 101.

The result, as shown in FIG. 24 and 25, is subsystem 101 having projector 102 shine a light beam 392 onto the underside of housing object 122—so that an illuminated image 390 of a clock appears.

Detection of Untagged Remote Object Touch

Figure 35A:
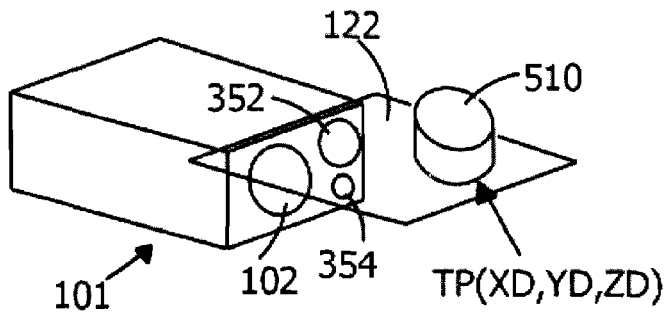
FIG. 35A is a perspective view of projection subsystem and an untagged housing, with an untagged remote object touching the housing.
Figure 35B:
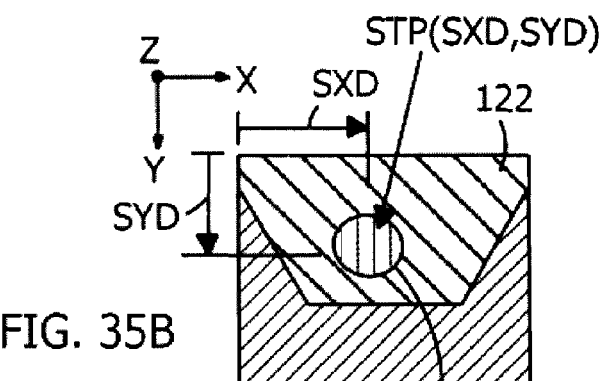
FIG. 35B is an image sensor view of an untagged housing, with a untagged remote object touching the housing.

Now turning to FIG. 35A, an untagged remote object 510 is touching the housing object 122, where housing object 122 resides between the remote object 514 and image sensor 352. Remote object 510 is at touch point TP, the point of contact. Then turning to FIG. 35B, the resulting image sensor background view 360 is uniformly lit. However, within the housing object 122 region is a brightly lit region of remote object 510. As a result, the remote object 510 touch is detectable by image sensor 352, which generates a view change signal for the control unit (not shown) in subsystem 101. Hence subsystem 101 may locate sensor touch position STP and track its movement for touch analysis. Moreover, subsystem 101 can track multiple sensor touch positions STP for multi-touch interactivity.

If subsystem 101 detects a known remote object 510, the projector 102 may be activated, illuminating housing object 122 and remote object 510 with a visible image (not shown). Moreover, subsystem 101 may alter its projected image to correspond to the touch position TP relative to subsystem 101.

Figure 39:
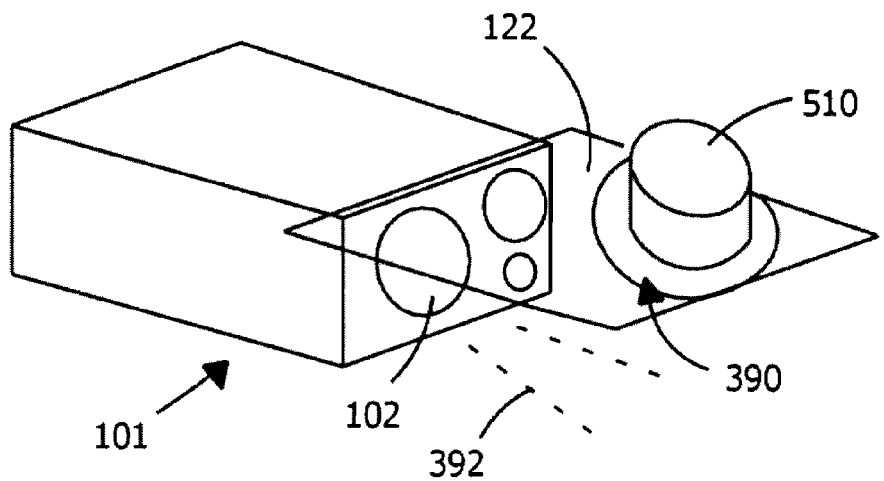
FIG. 39 is a perspective view of projection subsystem with a remote object touching the housing.

The result, as shown in FIG. 39, is subsystem 101 having projector 102 shine a light beam 392 onto the underside of housing object 122—so that illuminated image 390 surrounds the remote object 510.

Detection of Tagged Remote Object Touch

Figure 36A:
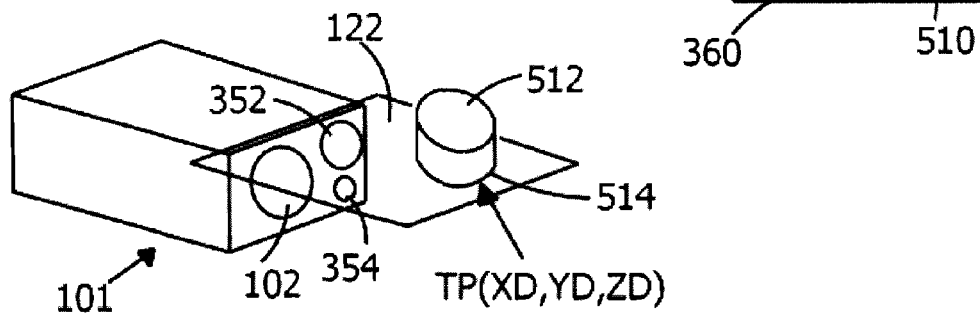
FIG. 36A is a perspective view of projection subsystem and an untagged housing, with a tagged remote object touching the housing.
Figure 36B:
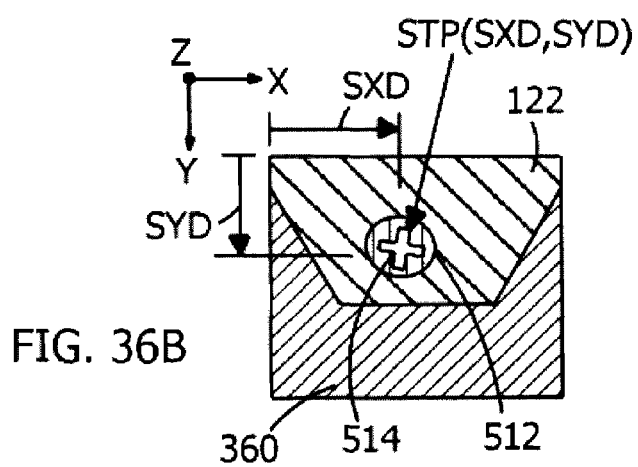
FIG. 36B is an image sensor view of an untagged housing, with a tagged remote object touching the housing.

Now turning to FIG. 36A, a tagged remote object 512 is touching the housing object 122, where housing object 122 resides between the remote object 514 and image sensor 352. Remote object 512 has an identifying tag (under the object and not shown) at touch point TP. Then turning to FIG. 36B, the resulting image sensor background view 360 is uniformly lit. However, within the housing object 122 region is a brightly lit region of remote object 512 and an even brighter identifying tag 514. As a result, the remote object 512 touch is detectable and identifiable by image sensor 352, which generates a view change signal for the control unit (not shown) in subsystem 101. Hence subsystem 101 may identify the remote object 512, locate sensor touch position STP, and track its movement for touch analysis. Moreover, subsystem 101 can track multiple sensor touch positions STP for multi-touch interactivity.

If subsystem 101 identifies a known remote object 512, the projector 102 may be activated, illuminating housing object 122 and remote object 512 with a visible image (not shown). Moreover, subsystem 101 may alter its projected image to correspond to the touch position TP relative to subsystem 101.

The result, as shown in FIG. 39, is subsystem 101 having projector 102 shine a light beam 392 onto the underside of housing object 122—so that illuminated image 390 surrounds the remote object 512. Examples of tagged remote objects 512 that interact with subsystem 101 include a playing card, game token, toy character, document, etc.

Detection of Untagged Remote Object

Figure 37A:
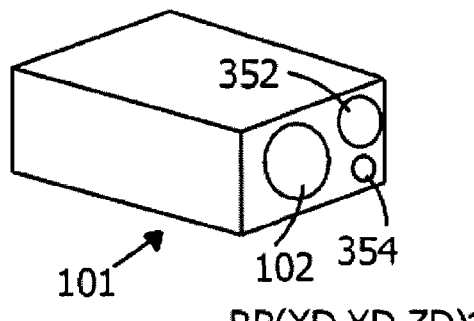
FIG. 37A is a perspective view of projection subsystem, with an untagged remote object below the housing.
Figure 37B:
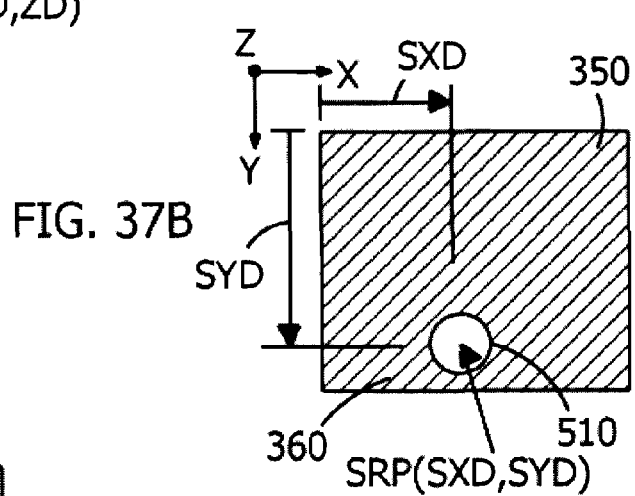
FIG. 37B is an image sensor view of an untagged housing, with an untagged remote object.

Now turning to FIG. 37A, an untagged remote object 510 is near subsystem 101, with nothing between the remote object 510 and image sensor 352. Remote object 5 10 is at remote point RP. Then turning to FIG. 37B, the resulting image sensor background view 360 is uniformly lit. However, below the housing object 122 region is a bright region of remote object 510. As a result, the remote object 510 is detectable by image sensor 352, which generates a view change signal for the control unit (not shown) in subsystem 101. Hence subsystem 101 may locate sensor remote position SRP and track its movement for remote object analysis. Moreover, subsystem 101 can track multiple sensor remote positions SRP for multi-object interactivity.

If subsystem 101 detects a known remote object 510, the projector 102 may be activated, illuminating the remote object 510 with a visible image (not shown). Moreover, subsystem 101 may alter its projected image to correspond to the remote position RP relative to subsystem 101.

Figure 40:
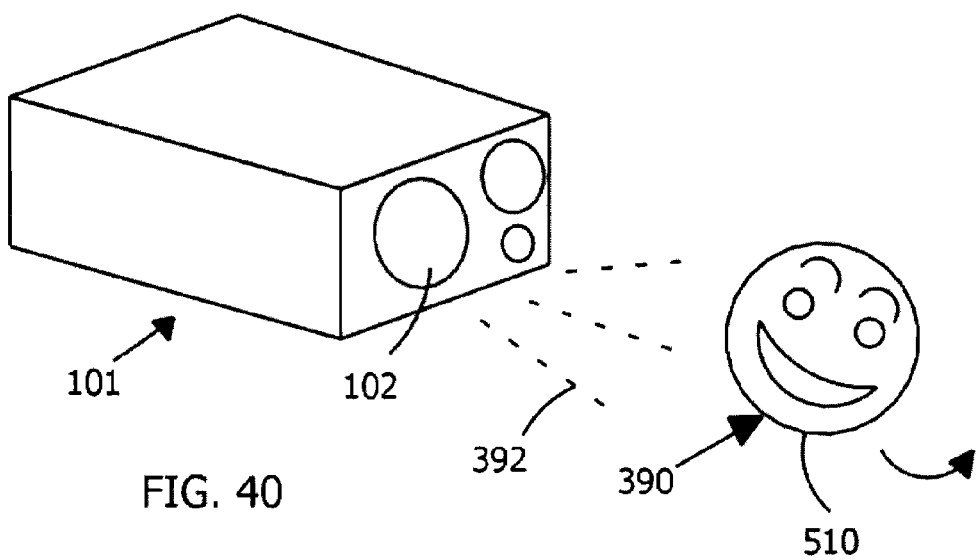
FIG. 40 is a perspective view of projection subsystem with a remote object not touching the housing.

The result, as shown in FIG. 40, is subsystem 101 having projector 102 shine a light beam 392 onto remote object 510—so that illuminated image 390 appears on remote object 510.

Detection of Tagged Remote Object

Figure 38A:
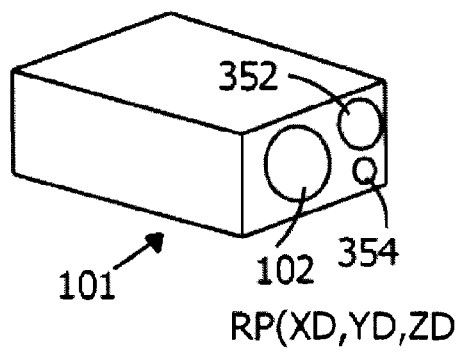
FIG. 38A is a perspective view of projection subsystem, with a tagged remote object below the housing.
Figure 38B:
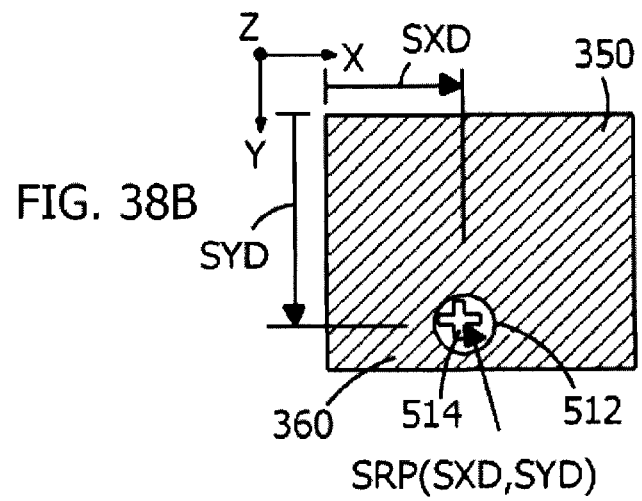
FIG. 38B is an image sensor view of an untagged housing, with a tagged remote object.

Now turning to FIG. 38A, a tagged remote object 512 is near subsystem 101, with nothing between the remote object 512 and image sensor 352. Remote object 512 is at remote point RP. Then turning to FIG. 38B, the resulting image sensor background view 360 is uniformly lit. However, below the housing object 122 region is a bright region of remote object 512, and a brighter identifying tag 514. As a result, the remote object 510 is identifiable by image sensor 352, which generates a view change signal for the control unit (not shown) in subsystem 101. Hence subsystem 101 may identify remote object 512, locate sensor remote position SRP, and track its movement for remote object analysis. Moreover, subsystem 101 can track multiple sensor remote positions SRP for multi-object interactivity.

If subsystem 101 detects a known remote object 512, the projector 102 may be activated, illuminating the remote object 512 with a visible image (not shown). Moreover, subsystem 101 may alter its projected image to correspond to the remote position RP relative to subsystem 101.

The result, as shown in FIG. 40, is subsystem 101 having projector 102 shine a light beam 392 onto remote object 510—so that illuminated image 390 appears on remote object 510.

Operation of Remote Blob Detection and Identification

Figure 41:
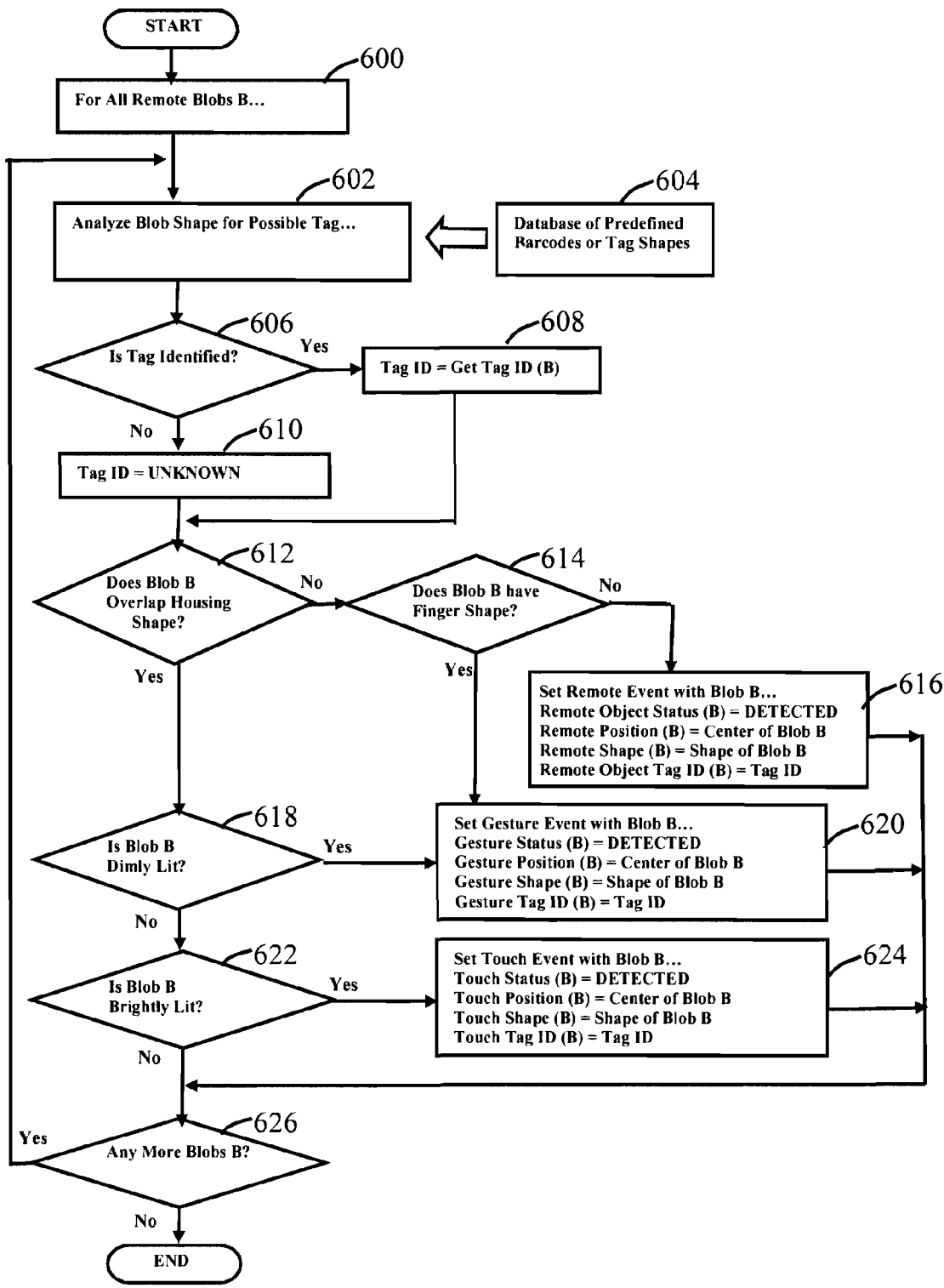
FIG. 41 is a flow diagram of a method to analyze the remote blobs for a tag or remote object, gesture, or touch—and set an event if detected.

Turning now to FIG. 41 is shown a flow diagram of remote blob detection, tracking, and identification. In step 600, all remote blobs will be processed, starting with the first remote blob B.

Then in step 602, the shape of the remote blob B is analyzed to determine if a remote tag or barcode. That is, the blob shape is compared against all of the known remote tag and barcode shapes contained in a database, defined in step 604. Shape comparison is typically done in the art by functions such as Hausdorff distance, Hamming distance, neural networks, etc.

In step 606, if the blob B is a tag or barcode, the tag id is retrieved in step 608. If the blob is not a tag, the tag id is set to unknown in step 610.

Then in step 612, if the shape and position of the blob B overlaps any actively observed housing shape, then skip to step 618. Overlap detection is typically done in the art using a collision detection function.

Otherwise, in step 614, if the blob shape is finger shaped, then skip to step 620 for gesture processing. Again, a standard shape comparison function known in the art may be used.

In step 616, the blob B detected is a remote object, so set a remote event using the attributes of blob B, then skip to step 626.

In step 618, if the blob B is not dimly lit, skip to step 622. To accomplish this task, an average brightness of blob pixels is taken and compared against a low brightness threshold.

Otherwise, in step 620, the blob B detected is a finger gesture, so set a gesture event using the attributes of blob B, then skip to step 626.

In step 622, if the blob B is not brightly lit, skip to step 626. To accomplish this task, an average brightness of blob pixels is taken and compared against a high brightness threshold.

Otherwise, in step 624, the blob B detected is a housing touch, so set a touch event using the attributes of blob B.

Finally in step 626, if any more remote blobs B exist, process the next blob B in step 602.

Operation of Gesture Event Response

Figure 42:
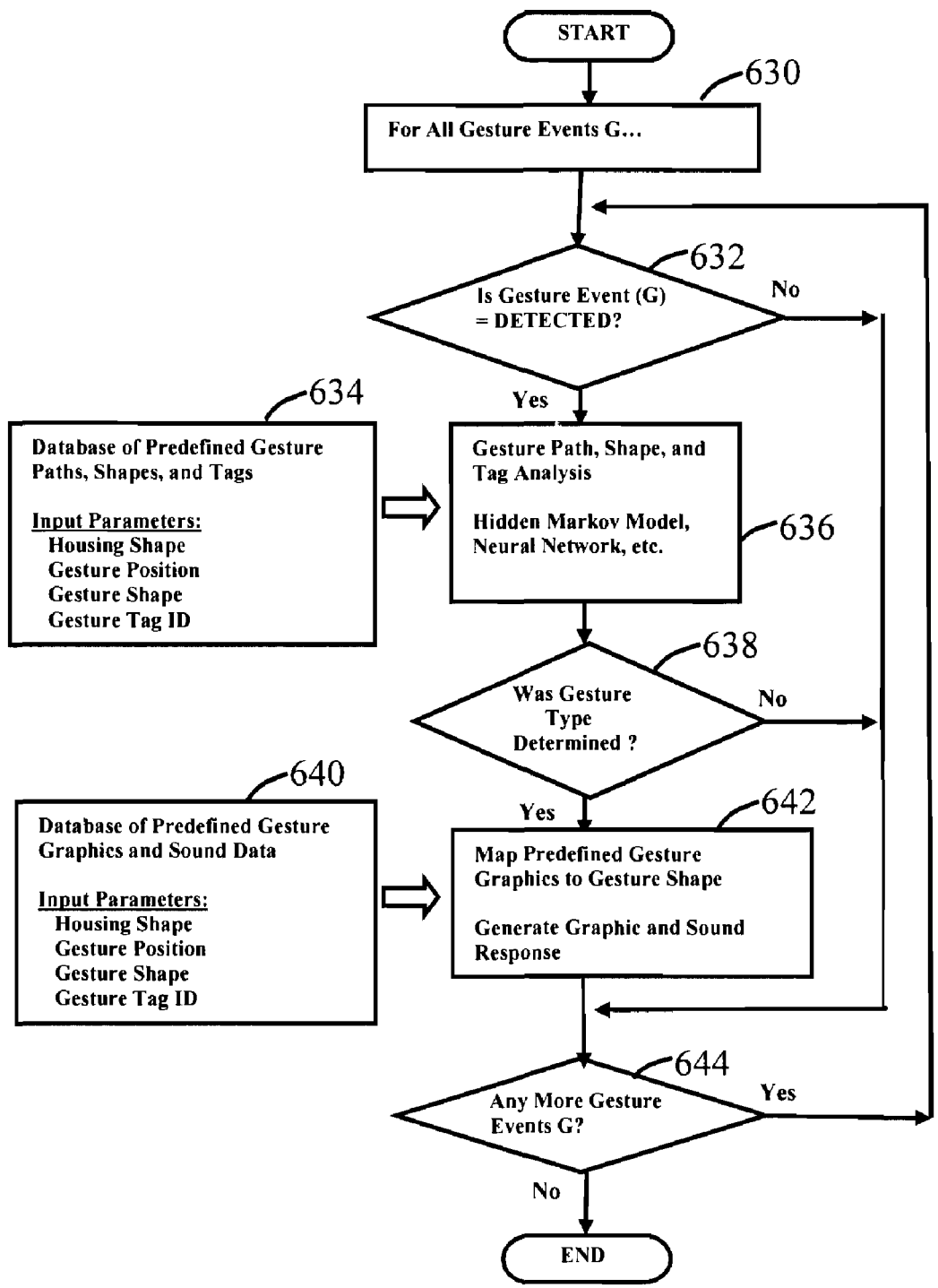
FIG. 42 is a flow diagram of a method to analyze the gesture events, and if a gesture is detected, generate a gesture response video.

There shown in FIG. 42 is a flow diagram for an operational response to detected gesture events. Starting with step 630, all gesture events are processed, starting with the first gesture event G.

In step 632, if gesture event G was not detected, skip to step 644.

Otherwise, in step 636, analyze the gesture event's path, shape and possible tag using various schemes known in the art, such as hidden Markov model, neural network, etc. Analyze for a single gesture or multi-gesture. That is, compare the event's gesture event path or paths against a database of predefined gesture paths, shown in step 634.

In step 638, if the gesture type is not determined, skip to step 644.

Otherwise, in step 642, create an image transformation mapping using the gesture shape, housing shape, etc. Then render gesture graphics and retrieve gesture sound for a response action. The response data comes from a database of predefined gesture graphics and sound, shown in step 640.

Finally, in step 644, if any more gesture events G exist, process the next gesture event G in step 632.

Operation of Touch Event Response

Figure 43:
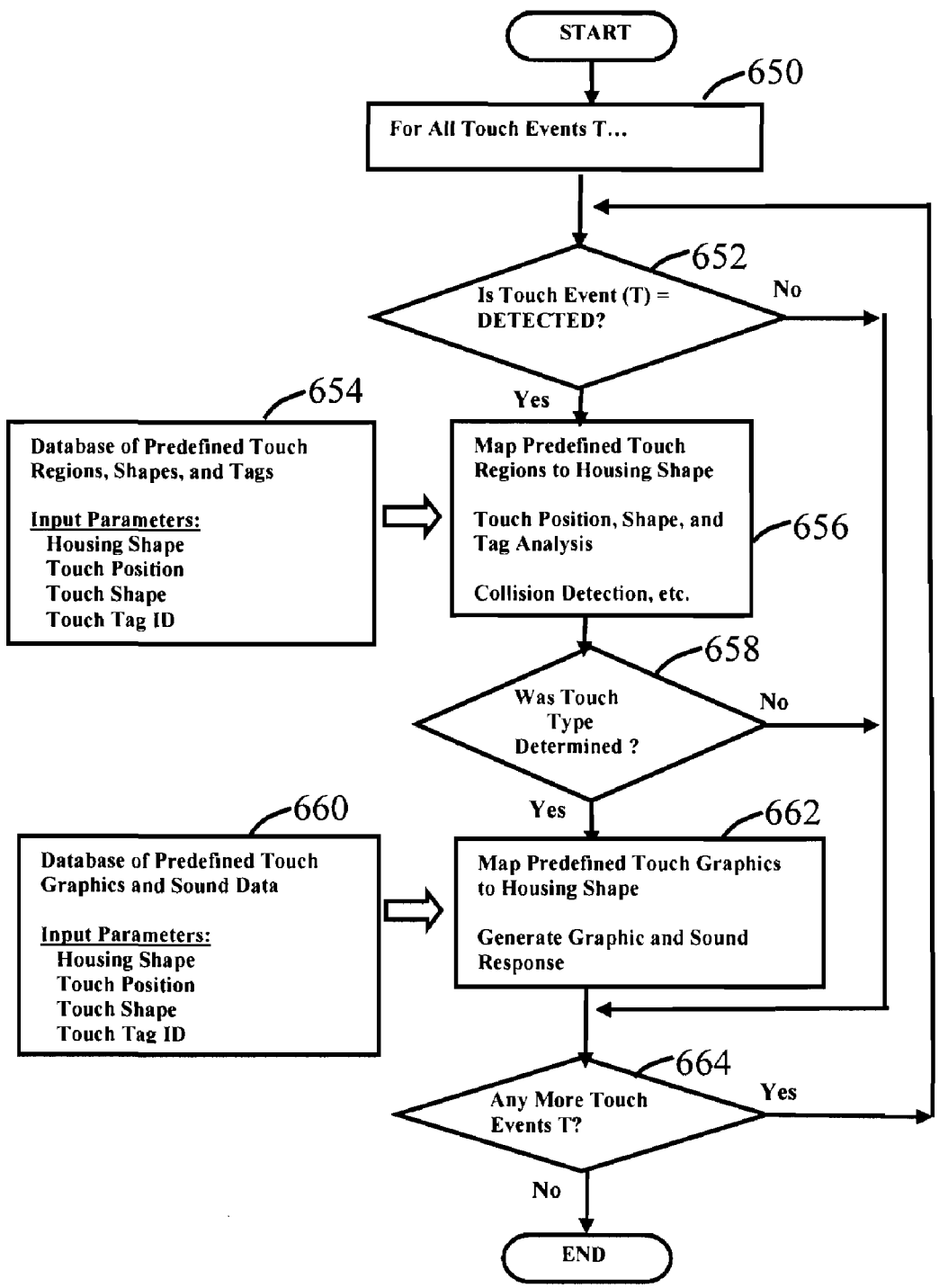
FIG. 43 is a flow diagram of a method to analyze the touch events, and if a touch is detected, generate a touch response video.

There shown in FIG. 43 is a flow diagram for an operational response to detected touch events. Starting with step 650, all touch events are processed, starting with the first touch event T.

In step 652, if touch event T was not detected, skip to step 664.

Otherwise, in step 656, analyze the touch event's position, shape and possible tag using various schemes known in the art, such as collision detection, etc. Analyze for a single touch or multi-touch. That is, compare the touch event position or positions against a database of predefined touch regions that have been mapped to the housing shape, shown in step 654. The mapping is necessary so that the predefined touch regions correspond to the current housing form, which may vary in shape and position.

In step 658, if the touch type is not determined, skip to step 664.

Otherwise, in step 662, create an image transformation mapping using the touch shape, housing shape, etc. Then render the touch graphics and retrieve the touch sound for a response action. The response data comes from a database of predefined touch graphics and sound, shown in step 660.

Finally, in step 664, if any more touch events T exist, process the next touch event T in step 652.

Operation of Remote Object Event Response

Figure 44:
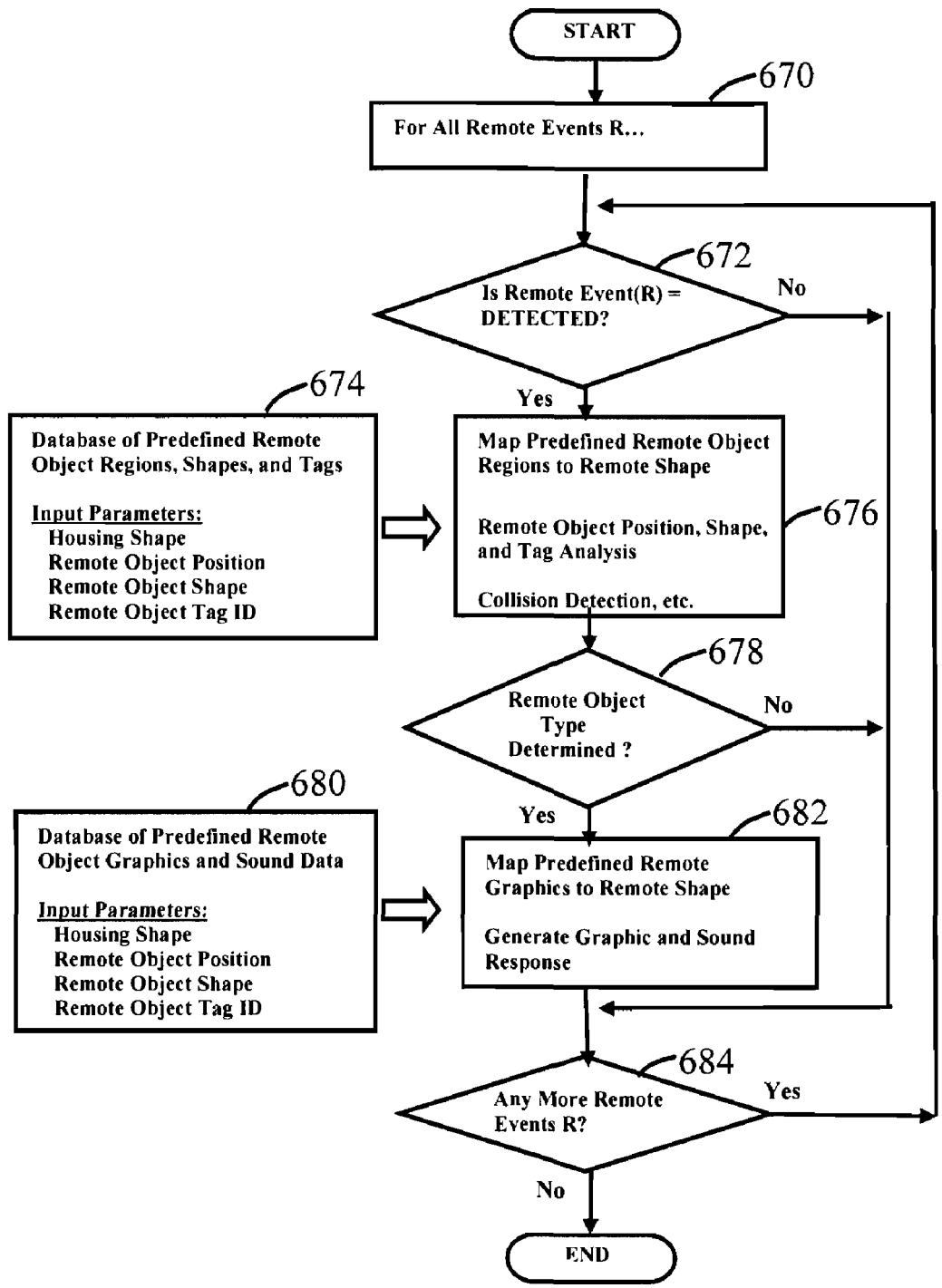
FIG. 44 is a flow diagram of a method to analyze the remote object events, and if a remote object is detected, generate a remote object response video.

There shown in FIG. 44 is a flow diagram for an operational response to detected remote object events. Starting with step 670, all remote events are processed, starting with the first remote event R.

In step 672, if remote event R was not detected, skip to step 684.

Otherwise, in step 676, analyze the remote event's position, shape and possible tag using various schemes known in the art, such as collision detection, etc. Compare the remote event position against a database of predefined remote object regions that have been mapped to the remote object position, shown in step 674. The mapping is necessary so that the predefined remote object regions and shapes correspond to the current remote object position and shape, which may vary if object is in relative motion.

In step 678, if the remote object type is not determined, skip to step 684.

Otherwise, in step 682, create an image transformation mapping using the remote object shape, housing shape, etc. Then render the remote object graphics and retrieve the remote object sound for a response action. The response data comes from a database of predefined remote object graphics and sound, shown in step 680.

Finally, in step 684, if any more remote events R exist, process the next remote event R in step 672.

Operation of Mapping to Object Surface

An important aspect of the present invention is to map and render the projected image onto a housing object or remote object. For without image mapping, the projected image will likely appear distorted on the object's surface. Whereby, the transformable projection system will purposefully distort or prewarp the projected image so that it appears undistorted on an illuminated 3-D object, such as a sphere, plane, or box.

Fortunately, there are many methods known in the art for image mapping and warping. Mathematical functions such as linear conformal, affine, projective, and polynomial transformations enable graphic coordinates to be mapped from a first image shape onto a second image shape. A few examples of mapping techniques known in the art include U.S. Pat. Nos. 6,709,116, 6,811,264, and U.S. Pat. Publication No. 2004/0184013.

In addition, the image mapping process may be adaptive or fixed. An adaptive mapping process is where the present invention determines the position and shape of the object, and then derives the necessary mapping to create an undistorted illuminated image on the object. For example, if the system projects an image onto a flying remote object, the system will need to continually adapt, adjusting the mapping and warping of the projected image.

A fixed mapping process is where the present invention relies on a known object position and shape. Whereby, the system includes a database of predefined warped images that require no additional mapping. For example, if the system is comprised of a sphere shaped housing object having a specific position, the system retrieves from its database a predefined warped image that when projected, will illuminate the sphere in an undistorted manner.

Understandably, touch, gesture, and remote interactivity will also rely on coordinate mapping, as described earlier in FIGS. 42-44. When sensing a touch, the touch positions are dynamically mapped to the detected housing surface. Fortunately, the same techniques used for image mapping may be applied to position mapping for touch, gesture, or remote events.

Customized First Embodiment—A Multi-Function, Transformable Device

Figure 45:
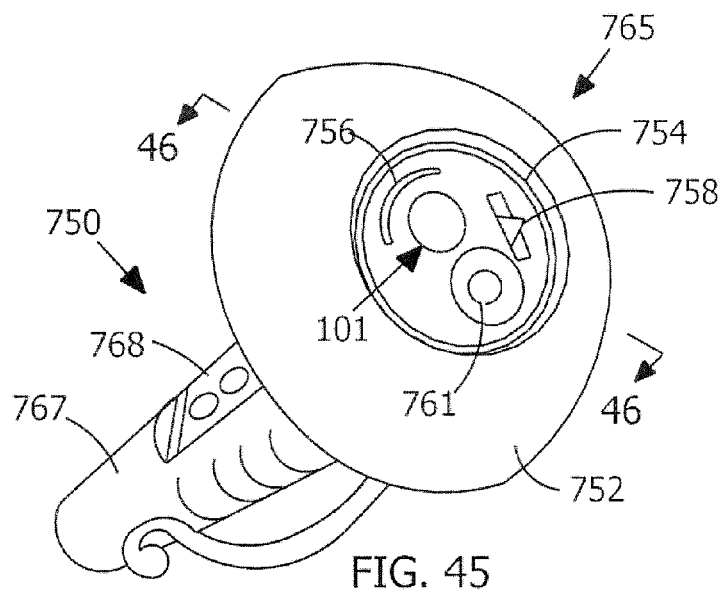
FIG. 45 shows a perspective view of a first embodiment of the present invention, which is compactly shaped.
Figure 46:
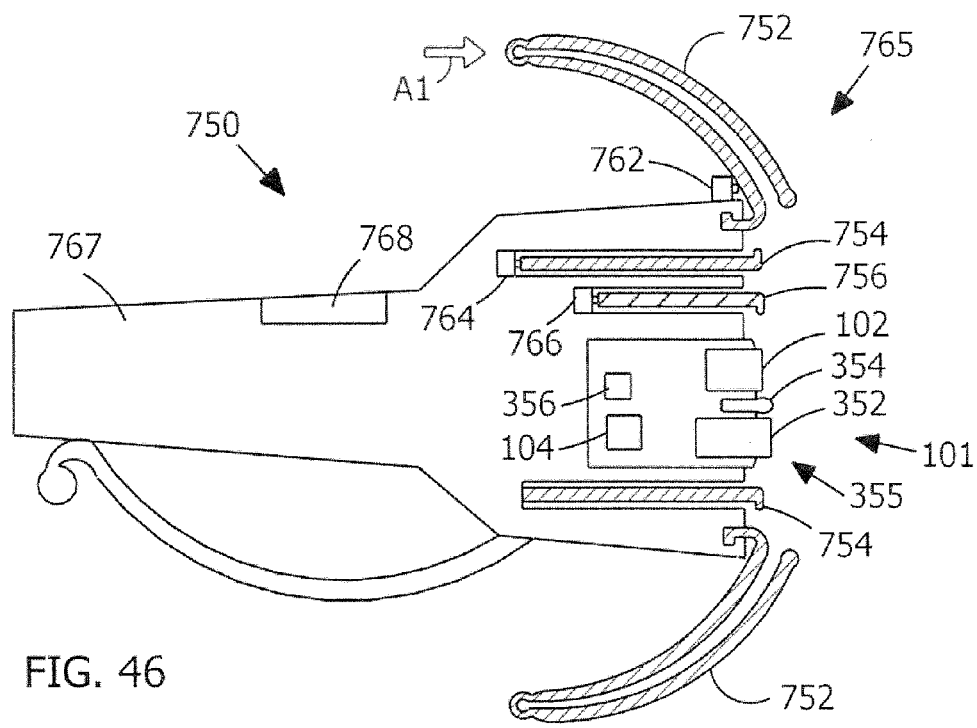
FIG. 46 shows a section view of the first embodiment, which is compactly shaped.

Thereshown in FIGS. 45-51 is a customized first embodiment, referred to as a multi-function device 750 designed in accordance with the present disclosure. Many of the same components described earlier will have similar reference numerals for similar parts. Turning specifically to FIGS. 45 and 46, the multi-function device 750 has a handle 767 to grip, along with a barrel cap 765 for the projection of light much like a flashlight. Mounted on handle 767 is a touchpad 768, enabling a user to operatively control the device 750. Further, the barrel cap 765 is comprised of projection subsystem 101, which may be constructed similar to the projection subsystem 101 defined earlier, as in FIGS. 1 and 2.

So thereshown in FIG. 46 is projection subsystem 101 comprised of control unit 104, which is operably coupled to a light projector 102, image sensor 352, illuminating emitter 354, spatial sensor 356, and touchpad 768. The image sensor 352 is an infrared light-sensitive CMOS camera, having a forward view from the device. The illuminating emitter 354 is an infrared LED. Further, subsystem 101 contains a camera-based tag reader 355 to locate and identify visual tags, barcodes, and markers. The camera-based tag reader 355 is comprised of image sensor 352 and illuminating emitter 354. Further, the spatial sensor 356 is a 3-axis accelerometer that produces a move signal to control unit 104 when subsystem 101 is moved or rotated in space. Finally, projection subsystem 101 is further comprised of a sensory input and output module, power source, memory, data link, and object identification and detection modules, all of which are not shown for the sake of brevity.

Shown in detail in FIG. 46, the multi-function device 750 is very much aware of its housing objects; whereby, position sensors 762, 764, 766 are mounted within device 750. The position sensors 762, 764, 766 are all electronic contact switches and operably coupled to control unit 104, providing a housing position change signal to control unit 104.

The multi-function device 750 includes expandable, translucent "housing objects" that can be transformed into different shapes, depending on the user's needs. For example, in FIGS. 45 and 46, there is an expandable ball surround 752 (also called a "housing object" as defined earlier) that has the shape of a bowl when collapsed. The ball surround 752 is made of a soft, flexible, translucent polymer, such as high-density urethane, polyethylene, or silicone rubber. When a user (not shown) pushes on backside A1 (as denoted by arrow) of the ball surround 752, the surround 752 inverts and flexes outward, forming the ball surround 752 having a hollow ball shape, as shown in FIG. 47.

Figure 47:
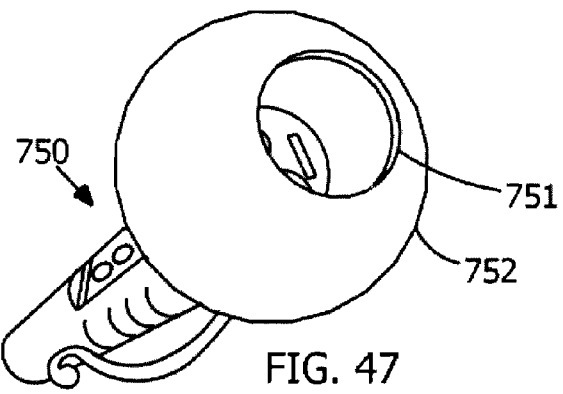
FIG. 47 shows a perspective view of the first embodiment, which is sphere shaped.

Also seen in FIG. 47, the expanded ball surround 752 has an uncovered aperture 751 enabling device 750 to project a portion of the illuminated image forward onto an ambient surface. Device 750 can also project a portion of the illuminated image onto the interior of ball surround 752. Then using the same mechanism discussed earlier regarding touch, gesture, and remote object sensitivity (in FIGS. 31-40), the ball surround 752 may be illuminated with a projected image and is touch and gesture sensitive. That is, turning to FIG. 46, the device 750 utilizes the image sensor 352 and illuminating emitter 354 to detect remote objects, such as the user's finger touch.

Continuing with FIG. 46, the device 750 may also be moved or rotated in space, such that spatial sensor 356 produces a move signal to control unit 104. Whereby, device 750 can modify its projected image (e.g., on the housing objects, such as on ball surround 752 of FIG. 47) and behavior according to the device's 750 spatial orientation and motion.

When device 750 changes shape, the position sensor 762 opens when the ball surround 752 is transformed into a ball shape in FIG. 47, and the sensor 762 closes when the ball surround collapses and presses against sensor 762 in FIG. 46. The position sensor 762 provides a position change signal to control unit 104 indicating whether the ball surround 752 is expanded or collapsed. Whereby, the device 750 can modify its projected image and behavior according to the device's 750 transformable shape.

Figure 48:
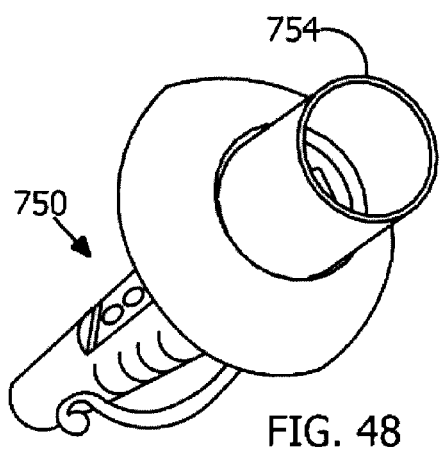
FIG. 48 shows a perspective view of the first embodiment, which is tube shaped.

Referring now to FIG. 48, the multi-function device 750 can be transformed into a tube shape. An expandable tube 754 (also called a "housing object" as defined earlier) is made of a translucent or clear polymer such as polyethylene or acrylic. Again, the expandable tube 754 may be illuminated with a projected image and is touch/gesture sensitive. Turning to FIG. 46, to expand the tube, the user grips the expandable tube 754 lip, and pulls outward causing the tube 754 to slide out from a pocket in the device's 750 body. The position sensor 764 provides a position change signal to control unit 104 indicating whether the tube 754 is extended or collapsed. Whereby, the device 750 can modify its projected image and behavior according to its transformable shape.

Figure 49:
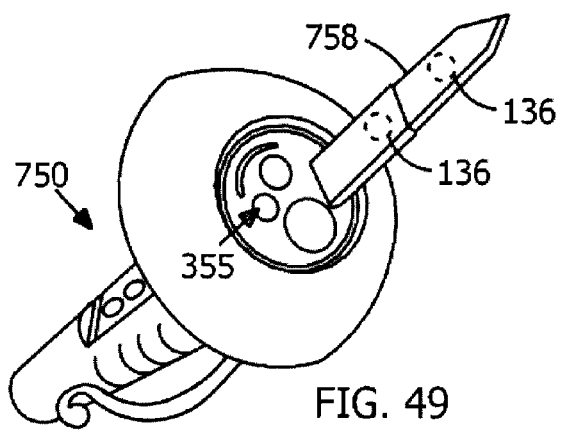
FIG. 49 shows a perspective view of the first embodiment, which is saber shaped.

Referring now to FIG. 49, the multi-function device 750 can be transformed into a saber shape. An expandable saber 758 (also called a "housing object" as defined earlier) is telescoping and made of a translucent or clear polymer such as polyethylene or acrylic. Again, the saber 758 is illuminated with a projected image and is gesture/touch sensitive. Moreover, the saber 758 contains two identifying tags 136 detectable by camera-based tag reader 355. To expand the saber, the user grips the expandable saber 758 tip (in FIG. 45), and pulls outward causing the saber 758 to expand out from a pocket in the device's 750 body. Then in FIG. 46, the camera-based tag reader 355 provides a position change signal to control unit 104 indicating whether the saber 758 is extended or collapsed. Whereby, the device 750 can modify its projected image and behavior according to its transformable shape.

Figure 50:
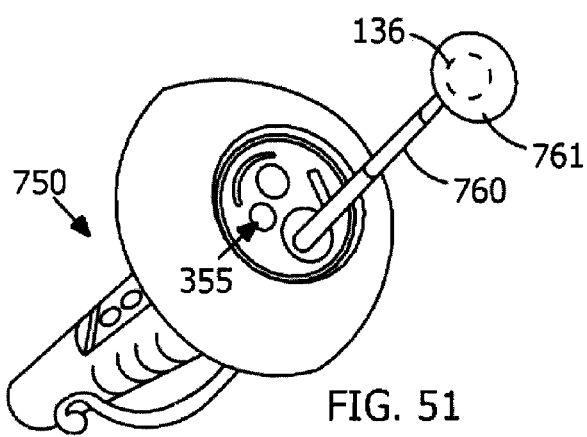
FIG. 50 shows a perspective view of the first embodiment, which is panel shaped.

Referring now to FIG. 50, the multi-function device 750 can be transformed into a panel shape. An expandable panel 756 (also called a "housing object" as defined earlier) is made of a translucent polymer such as polyethylene or acrylic. Again, the panel 756 is illuminated with a projected image and is gesture/touch sensitive. To expand the panel, the user grips the expandable panel 756 lip (seen in FIG. 46), and pulls outward causing the panel 756 to slide out from a pocket in the device's 750 body. The position sensor 766 provides a position change signal to control unit 104 indicating whether the panel 756 is extended or collapsed. Whereby, the device 750 can modify its projected image and behavior according to its transformable shape.

Figure 51:
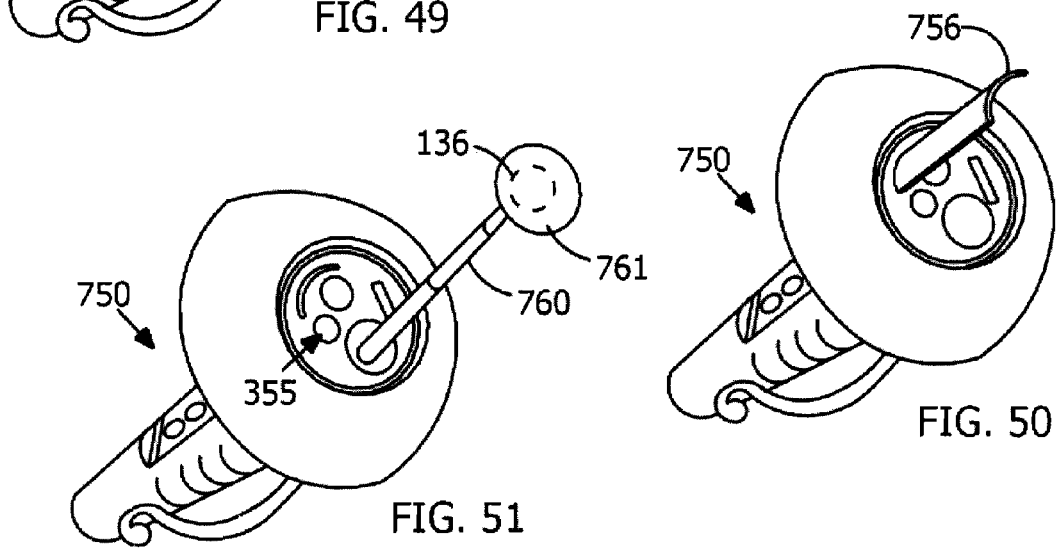
FIG. 51 shows a perspective view of the first embodiment, which is pole shaped.

Referring now to FIG. 51, the multi-function device 750 can be transformed into a pole shape. An expandable pole 760 (also called a "housing object" as defined earlier) is a telescoping tube made of polymer such as polyethylene or acrylic. The pole 760 has a display tip 761 that is ball shaped, although other kinds of tips, such as a flag, disk, or balloon are clearly contemplated as being within the scope of the present invention. The display tip 761 contains an identifying tag 136 detectable by the camera-based tag reader 355. Again, the pole 760 and display tip 756 is illuminated with a projected image and is gesture/touch sensitive. To expand the pole 760, the user grips the display tip 761 (shown in FIG. 45), and pulls outward causing the tip 761 and pole 760 to expand out from a pocket in the device's 750 body. Then in FIG. 46, the camera-based tag reader 355 provides a position change signal to control unit 104 indicating whether the pole 760 is extended or collapsed. Whereby, the device 750 can modify its projected image and behavior according to its transformable shape.

Customized Second Embodiment—A Squishy, Transformable Device

Figure 52:
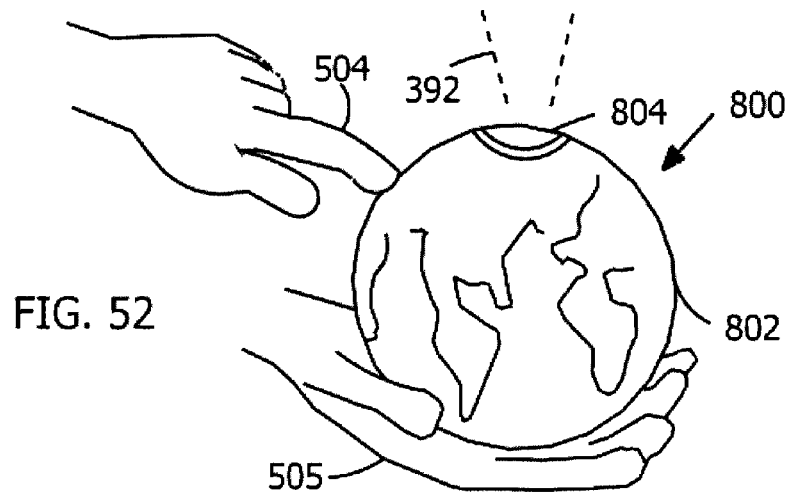
FIG. 52 shows a perspective view of a second embodiment of the present invention, which is sphere shaped.
Figure 53:
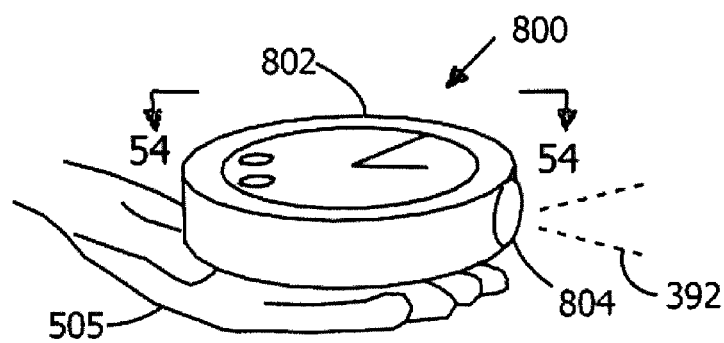
FIG. 53 shows a perspective view of the second embodiment, which is disk shaped.
Figure 54:
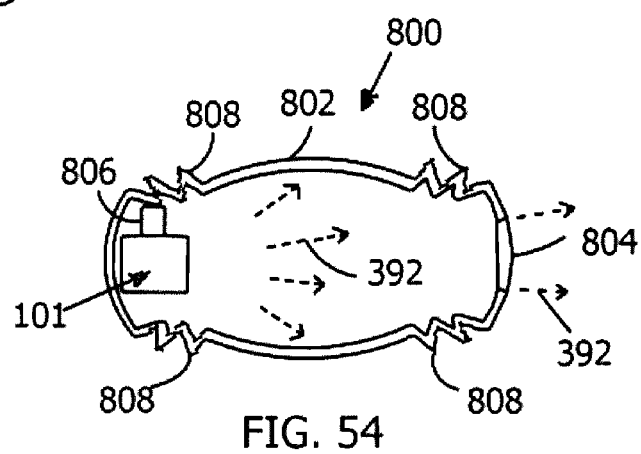
FIG. 54 is a section view of the second embodiment, which is disk shaped.

Thereshown in FIGS. 52-54 is a customized second embodiment, referred to as a squishy device 800 designed in accordance with the present disclosure. In FIG. 52, the squishy device 800 is held in a human hand 505, and interacted with by touching its surface with a human finger 504. Device 800 has a flexible housing 802 that is ball shaped having 100 mm diameter, although other shapes and sizes may well be considered. The housing 802 (also called a "housing object" as defined earlier) is made of soft, flexible, translucent polymer skin such as polyethylene, high-density polyurethane, or PET. Further, housing 802 has an optimum thickness such that it can be shape-altered by squeezing or pushing.

Then turning to FIG. 53, the housing 802 has been squashed into a puck shaped device about 10 mm high by 100 mm in diameter. On the housing 802 surface is displayed a ticking gold watch. In FIGS. 52-54, on one side of the housing 802 is a covered aperture 804. The covered aperture 804 is made of acrylic or other transparent polymer, which serves as a protective window.

In more detail, FIG. 54 shows a sectional side view of device 800, where within housing 802 interior to one side is mounted a projection subsystem 101. The projection subsystem 101 is constructed in a similar manner to the subsystem 101 of the first embodiment. However, subsystem 101 contains an image projector (not shown) having a wide throw angle of about 90 degrees, creating a visible light beam 392 that illuminates the whole interior of device 800, with a portion of the beam 392 passing through aperture 804. The housing 802 also has in-molded living hinges 808, which may be collapsed and expanded innumerable times without breakage.

Further, a position sensor 808 is mounted inside and pressed against housing 802. As a result, the position sensor 808 is in a closed position when the housing 802 presses against sensor 808, and opened otherwise. Position sensor 808 is operably coupled to the control unit (not shown) of subsystem 101.

Turning back to FIG. 52, the operation of device 800 entails subsystem 101 creating a projected light image that passes through the covered aperture 804 and beyond the housing 802. In addition, a portion of the projected light illuminates the bulk of translucent housing 802.

The result is housing 802 acts as a viewable display, showing a colored, illuminated world globe to a user. The device 800 can also illuminate a landscape, bird, underwater coral reef, airplane control panel, etc. on housing 802. In addition, since subsystem 101 contains a spatial sensor (not shown) operably coupled to the control unit (not shown), the device's projected image may be modified according to the position and movement of the device 800. For example, rotating the device 800 in space may cause the illuminated image to tilt, pan, or zoom, giving the impression to the user of moving around a simulated 3D object.

Referring now to FIGS. 52 and 53, the device 800 can be transformed into a different physical shape. In FIG. 52, the user squeezes the sides of the ball shaped device 800, causing the sides to collapse and fold in like an accordion. Then turning to FIG. 53, the collapsed sides form the top and bottom surface of the disk shaped device 800. To change back to the ball shaped device 800, the user squeezes together opposite sides of the disk's outer rim. Whereby, the housing 802 sides pop outward again, forming the ball shaped device 800 of FIG. 52 again.

During operation, as shown in FIG. 54, the position sensor 808 provides a position change signal to control unit 104 indicating whether the housing 802 is expanded into a ball or contracted into a disk. Whereby, the device 800 can modify its projected image and interactive behavior according to its transformable shape.

Whereby, irrespective of the device's 800 shape, whether a ball in FIG. 52 or disk shape in FIG. 53, the housing 802 remains touch and gesture sensitive. For example, if the ball shaped device shows an illuminated world globe, the user may touch the Africa continent and an elephant appears. If the disk shaped device shows an illuminated, gold pocket watch, the user may touch the dial and reset the time.

Understandably, the present embodiment of the squishy device 800 has multiple uses. The ball shaped device is ideally suited for rapidly viewing 3D spaces or objects in all directions, 360 degrees in the round. In contrast, the disk shaped device is best suited for viewing 2D images and text, yet conveniently fits into the user's pocket.

Customized Third Embodiment—A Rollup, Transformable Device

Figure 55:
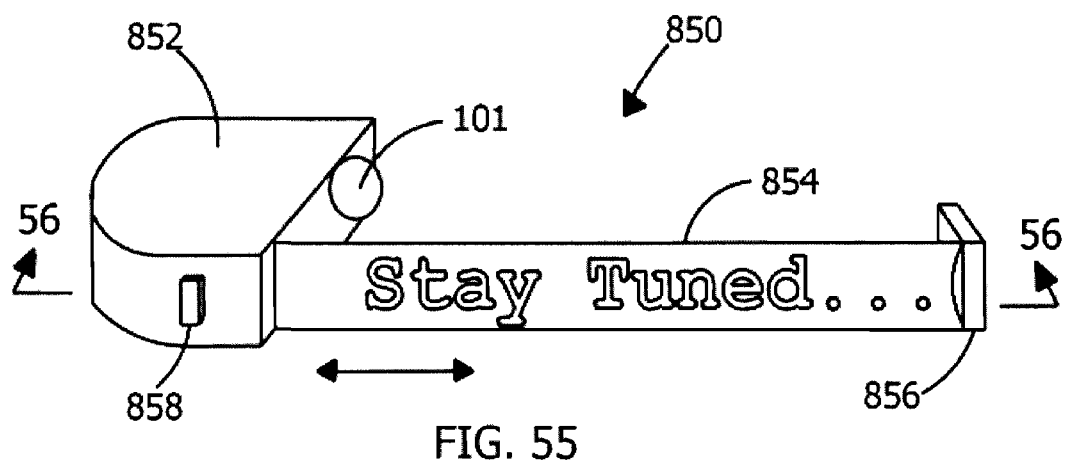
FIG. 55 is a perspective view of a third embodiment, which is rollup panel shaped.
Figure 56:
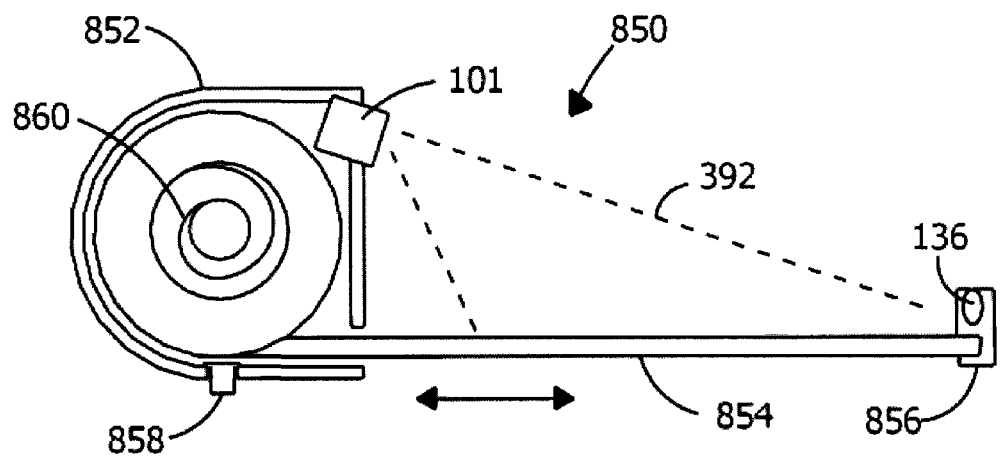
FIG. 56 is a section view of the third embodiment, which is rollup panel shaped.

Thereshown in FIGS. 55-56 is a customized third embodiment, referred to as a rollup device 850 designed in accordance with the present disclosure. The rollup device 850 has a case outer housing 852 made of durable, rigid plastic or metal, for example. Within housing 852 is a rollup panel 854 (also called a "housing object" as defined earlier), extendable from 0 to 3 meters outward from housing 852, for example. The rollup panel 854 may be made of a thin, flexible, translucent plastic, such as polyethylene or PET. At the very end of the rollup panel 854 is a panel tab 856, which may be made of rigid plastic.

Mounted within the housing 852 is projection subsystem 101. The projection subsystem 101 is constructed in a similar manner to the subsystem 101 of the first embodiment. As a result, subsystem 101 contains a camera-based tag reader (not shown) to locate and identify visual tags, barcodes, or markers.

Turning specifically to FIG. 56, a section view of device 850 is shown. The subsystem 101 is able to illuminate panel 854 with a light beam 390. In addition, the camera-based tag reader (not shown) included in subsystem 101 is able to view the panel tab 856 containing an identifying tag 136. Whereby, based on the position of tab 856, subsystem 101 is able to determine the position of panel 854.

Moreover, within housing 852 is a rollup spring 860, where one end is attached to the center of the housing and the other end is attached to the end of the rollup panel 854. The rollup spring 860 enables the rollup panel 854 to automatically retract into housing 852. Retract button 858 provides a mechanical braking mechanism.

In FIG. 55, during operation of the device 850, projection subsystem 101 illuminates the panel 854 with a visible image, such as text or graphics. Further, in a similar manner to the first embodiment, subsystem 101 enables the rollup panel to be gesture and touch-sensitive. When a finger touch occurs on the front of the rollup panel 854, the device 850 can modify its projected image to respond to the finger touch. For example, touching the word "Stay Tuned" causes subsystem 101 to display news, sports, or entertainment video on panel 854.

Though the disclosed embodiments are essentially mobile, there is no feature of the object-aware, transformable projection system that would preclude the system from being permanently fixed or immobile. For example, a transformable projection system may be mounted on a museum wall, such that the system can transform its shape and behavior for specific museum exhibits for curious visitors.

Various alternatives and embodiments are contemplated as being within the scope of the following claims particularly pointing out and distinctly claiming the subject matter regarded as the invention.

I claim:

1. An image projecting device, comprising:
a hand-held outer housing including at least one adjustable housing object that forms part of the outer housing; and
a projection subsystem, comprising:
a control unit;
a projector coupled to the control unit and positioned to project an image onto at least a portion of at least one housing object of the outer housing;
a sensor coupled to the control unit, wherein the sensor generates a detect signal received by the control unit upon detection of the presence of the housing object within a field of view of the sensor,
wherein the control unit modifies the projected image upon receipt of the detect signal.

2. The image projecting device of claim 1 wherein the sensor is one of a photo detect sensor, image sensor, magnetic field sensor, electric field sensor, inductance sensor, capacitance sensor, or ultrasonic sensor.

3. The image projecting device of claim 1 wherein the housing object of the outer housing is user-modifiable and moveable between at least a first condition and a second condition.

4. The image projecting device of claim 3 wherein the user-modifiable housing object of the outer housing includes at least a portion that is generally sphere shaped and collapsible for compactness.

5. The image projecting device of claim 3 wherein the user-modifiable housing object of the outer housing can be rolled up for compactness.

6. The image projecting device of claim 1 further comprising a spatial position sensor that generates a movement signal based upon the movement of the outer housing, wherein the movement signal is received by the control unit and the control unit modifies the image projected by the projector based upon the movement signal.

7. The image projecting device of claim 1 further comprising a wireless transceiver that receives and transmits information from the image projecting device.

8. The image projecting device of claim 1 further comprising an illuminating emitter that projects light, wherein the sensor is operable to detect reflection of the light by the housing object within the field of view of the sensor.

9. The image projecting device of claim 8 wherein the illuminating emitter is an infrared light emitter and the sensor is an infrared light sensor.

10. An image projecting device, comprising:
an outer housing including at least one housing object that forms part of the outer housing and is movable and user-configurable;
a projection subsystem, comprising:
a control unit;
an image projector operatively coupled to the control unit to generate an image created by the control unit onto the housing object; and
an input device operatively coupled to the control unit to provide a housing condition signal to the control unit, wherein the housing condition signal indicates the current configuration of the housing object of the outer housing.

11. The image projecting device of claim 10 wherein the input device is a user-actuated input device through which a user indicates to the device the current configuration of the housing object of the outer housing.

12. The image projecting device of claim 11 wherein the user-actuated input device is a touch sensitive input device.

13. The image projecting device of claim 10 wherein the input device is a sensor positioned to detect the configuration of the housing object, wherein the sensor generates the housing condition signal.

14. The image projecting device of claim 10 wherein the at least one housing object is transformable between a generally flat or bowl-shaped disc and a sphere.

15. The image projecting device of claim 13 wherein the sensor is one of a photo detect sensor, image sensor, magnetic field sensor, electric field sensor, inductance sensor, capacitance sensor, ultrasonic sensor, position sensor, or electronic switch.

16. The image projecting device of claim 13 further comprising an illuminating emitter that projects light from the outer housing, wherein the sensor detects reflected light from an object positioned near the outer housing.

17. The image projecting device of claim 16 wherein the illuminating emitter is an infrared light emitter and the sensor is an infrared light sensor.

18. The image projecting device of claim 13 wherein the sensor generates a view signal upon detection of an object positioned within a field of view of the sensor.

19. The image projecting device of claim 10 wherein at least a portion of the at least one housing object is translucent and the projector projects the image onto an interior of the translucent portion of the housing object.

20. An image projecting device, comprising:
a configurable outer housing including at least one housing object that forms part of the outer housing and that is movable between at least a first position and a second position, wherein the housing object includes an object identifier;
a projection subsystem, comprising:
a control unit;
an image projector operatively coupled to the control unit, wherein the image projector projects an image created by the control unit onto the at least one housing object; and
a sensor positioned to detect the presence of the housing object within a field of view of the sensor,
wherein the control unit modifies the image projected by the projector upon the detection of the housing object within the field of view of the sensor.

21. The image projecting device of claim 20 wherein the object identifier is a graphic identifier, marker, or barcode.

22. The image projecting device of claim 20 wherein the object identifier is an RFID tag.

23. The image projecting device of claim 20 wherein the sensor is positioned to detect the movement of the housing object between the first position and the second position, wherein the control unit modifies the image projected by the projector based upon the movement of the housing object between the first and second positions.

24. The image projecting device of claim 20 further comprising a spatial position sensor, wherein the spatial position sensor generates a movement signal based upon movement of the housing, wherein the movement signal is received by the control unit such that the control unit modifies the image projected by the projector based upon the movement signal.

25. The image projecting device of claim 20 further comprising an illuminating emitter that generates light that illuminates the object when the object is within the field of view of the sensor.

26. The image projecting device of claim 25 wherein the illuminating emitter is an infrared light emitter and the sensor is an infrared light sensor.

27. An image projecting device, comprising:
a configurable outer housing including at least one housing object that forms part of the outer housing and is modifiable between at least a first position and a second position;
a projection subsystem comprising:
a control unit;
an image projector operatively coupled to the control unit, wherein the image projector projects an image onto at least a portion of the housing object of the outer housing;
an input device coupled to the control unit to provide a signal to the control unit to indicate the position of the housing object;
wherein the control unit modifies the image projected by the image projector based on the signal from the input device such that the image is undistorted on the first position and second position of the housing object of the outer housing.

28. The image projecting device of claim 27 wherein the projection subsystem is removable from the outer housing.

29. The image projecting device of claim 27 wherein the housing object of the outer housing is generally sphere shaped and collapsible, or has at least a portion that is sphere shaped and collapsible, for compactness.

30. A method of operating an image projecting device comprising the steps of:
providing an outer housing having a housing object movable between a first position and a second position;
operating an image projector mounted to the image projecting device to generate an image;
activating a sensor mounted to the image projecting device, wherein the sensor detects the movement of the housing object of the outer housing between the first and second positions; and
modifying the image upon detection of the movement of the housing object of the outer housing.

31. The method of claim 30 wherein at least a portion of the image is generated onto the outer housing.

32. The method of claim 30 wherein the sensor detects the presence of an object within a field of view of the sensor, further comprising the step of modifying the image upon detection of the object.

* * * * *